(12) United States Patent
Woo et al.

(10) Patent No.: US 12,699,653 B2
(45) Date of Patent: Aug. 4, 2026

(54) DRAM CACHE TAG PROBING

(71) Applicant: Rambus Inc., San Jose, CA (US)

(72) Inventors: Steven C. Woo, Saratoga, CA (US);
Michael Raymond Miller, Raleigh, NC
(US); Taeksang Song, San Jose, CA
(US); Wendy Elsasser, Austin, TX
(US); Maryam Babaie, Davis, CA (US)

(73) Assignee: Rambus Inc., San Jose, CA (US)

( * ) Notice: Subject to any disclaimer, the term of this
patent is extended or adjusted under 35
U.S.C. 154(b) by 52 days.

(21) Appl. No.: 18/665,319

(22) Filed: May 15, 2024

(65) Prior Publication Data

US 2024/0394195 A1 Nov. 28, 2024

Related U.S. Application Data

(60) Provisional application No. 63/605,063, filed on Dec.
1, 2023, provisional application No. 63/468,139, filed
on May 22, 2023.

(51) Int. Cl.
G06F 12/084 (2016.01)
G06F 12/0895 (2016.01)
G06F 13/16 (2006.01)

(52) U.S. Cl.
CPC ........ G06F 12/0895 (2013.01); G06F 12/084
(2013.01); G06F 13/1668 (2013.01)

(58) Field of Classification Search
CPC . G06F 12/084; G06F 12/0895; G06F 13/1668
USPC ........................................................ 711/118
See application file for complete search history.

(56) References Cited

U.S. PATENT DOCUMENTS

| | | | |
|---|---|---|---|
| 7,337,372 B2 | 2/2008 | Zhang | |
| 8,990,488 B2 | 3/2015 | Haywood | |
| 9,390,783 B1 | 7/2016 | Maheshwari | |
| 10,282,322 B2 | 5/2019 | Nale et al. | |
| 10,678,719 B2 | 6/2020 | Ware et al. | |
| 10,810,144 B2 | 10/2020 | Lim et al. | |
| 10,891,241 B2 | 1/2021 | Zheng et al. | |
| 2003/0070044 A1 | 4/2003 | Jeddeloh | |
| 2010/0077136 A1* | 3/2010 | Ware ........................ G06F 12/08 |
| | | | 711/E12.001 |
| 2017/0168931 A1* | 6/2017 | Kim ................... G06F 12/0868 |

(Continued)

FOREIGN PATENT DOCUMENTS

WO WO-2023-107218 A1 6/2023

*Primary Examiner* — Hashem Farrokh
(74) *Attorney, Agent, or Firm* — The Neudeck Law Firm,
LLC

(57) ABSTRACT

A dynamic random access memory (DRAM) device
includes functions configured to aid with operating the
DRAM device as part of data caching functions. The DRAM
is configured to respond to at least two types of commands.
A first type of command (cache data access command) seeks
to access a cache line of data, if present in the DRAM cache.
A second type of command (cache probe command) seeks to
determine whether a cache line of data is present, but is not
requesting the data be returned in response. In response to
these types of access commands, the DRAM device is
configured to receive cache tag query values and to compare
stored cache tag values with the cache tag query values. A
hit/miss (HM) interface/bus may indicate the result of the
cache tag compare and stored cache line status bits to a
controller.

20 Claims, 16 Drawing Sheets

(56)    References Cited

U.S. PATENT DOCUMENTS

| | | | |
|---|---|---|---|
| 2018/0232310 A1* | 8/2018 | Chang | G06F 12/0864 |
| 2019/0057045 A1* | 2/2019 | Jiang | G06F 12/0866 |
| 2019/0179760 A1 | 6/2019 | Bhargava et al. | |
| 2019/0189210 A1* | 6/2019 | Farmahini Farahani | |
| | | | G11C 5/04 |
| 2020/0004686 A1 | 1/2020 | Miller et al. | |
| 2021/0200680 A1 | 7/2021 | Vogelsang et al. | |
| 2022/0165326 A1 | 5/2022 | Ware et al. | |
| 2022/0206965 A1 | 6/2022 | Lendvay | |

* cited by examiner

*FIG. 6A*

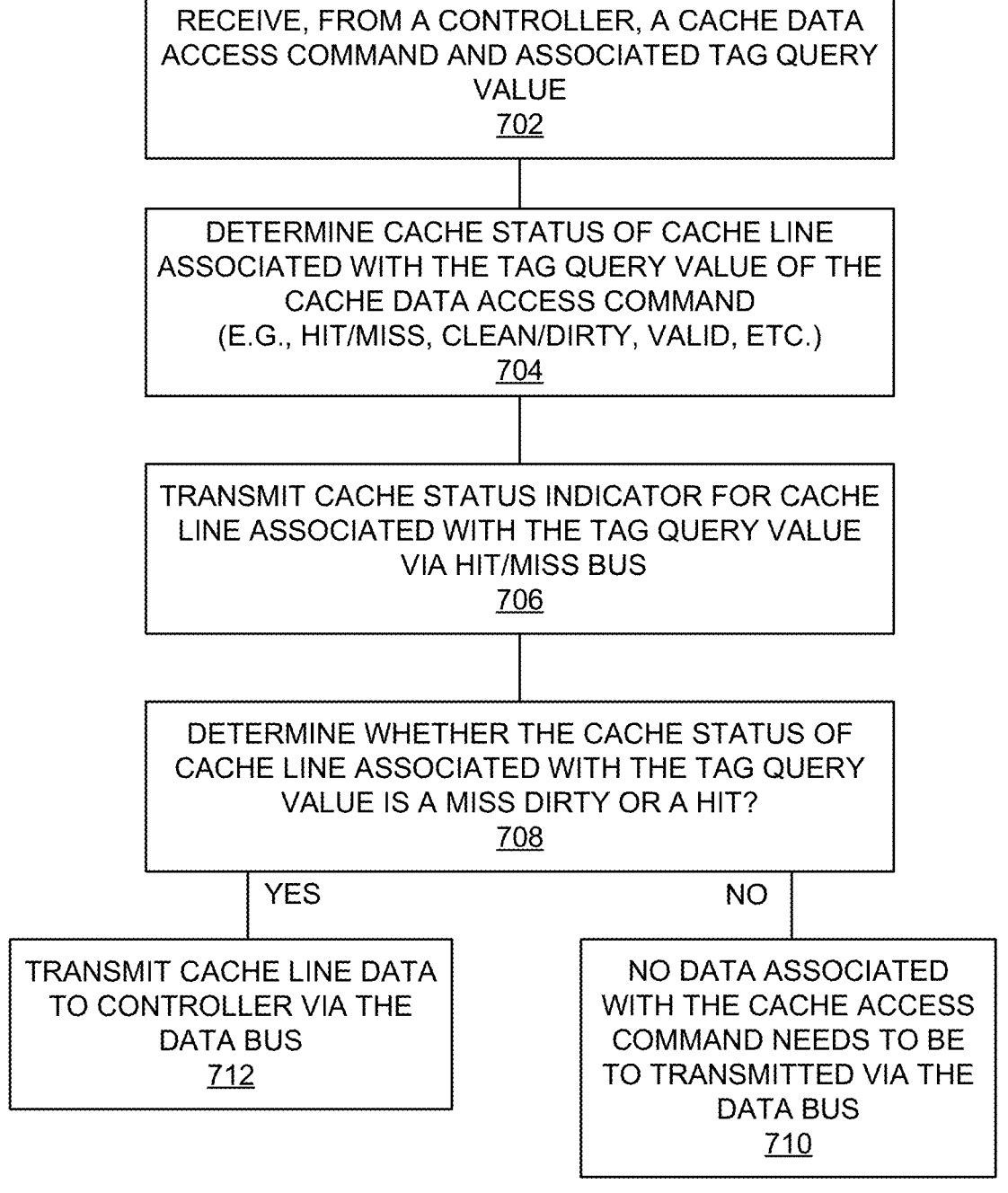

RECEIVE, FROM A CONTROLLER, A CACHE DATA ACCESS COMMAND AND ASSOCIATED TAG QUERY VALUE
702

DETERMINE CACHE STATUS OF CACHE LINE ASSOCIATED WITH THE TAG QUERY VALUE OF THE CACHE DATA ACCESS COMMAND
(E.G., HIT/MISS, CLEAN/DIRTY, VALID, ETC.)
704

TRANSMIT CACHE STATUS INDICATOR FOR CACHE LINE ASSOCIATED WITH THE TAG QUERY VALUE VIA HIT/MISS BUS
706

DETERMINE WHETHER THE CACHE STATUS OF CACHE LINE ASSOCIATED WITH THE TAG QUERY VALUE IS A MISS DIRTY OR A HIT?
708

YES

NO

TRANSMIT CACHE LINE DATA TO CONTROLLER VIA THE DATA BUS
712

NO DATA ASSOCIATED WITH THE CACHE ACCESS COMMAND NEEDS TO BE TO TRANSMITTED VIA THE DATA BUS
710

*FIG. 7*

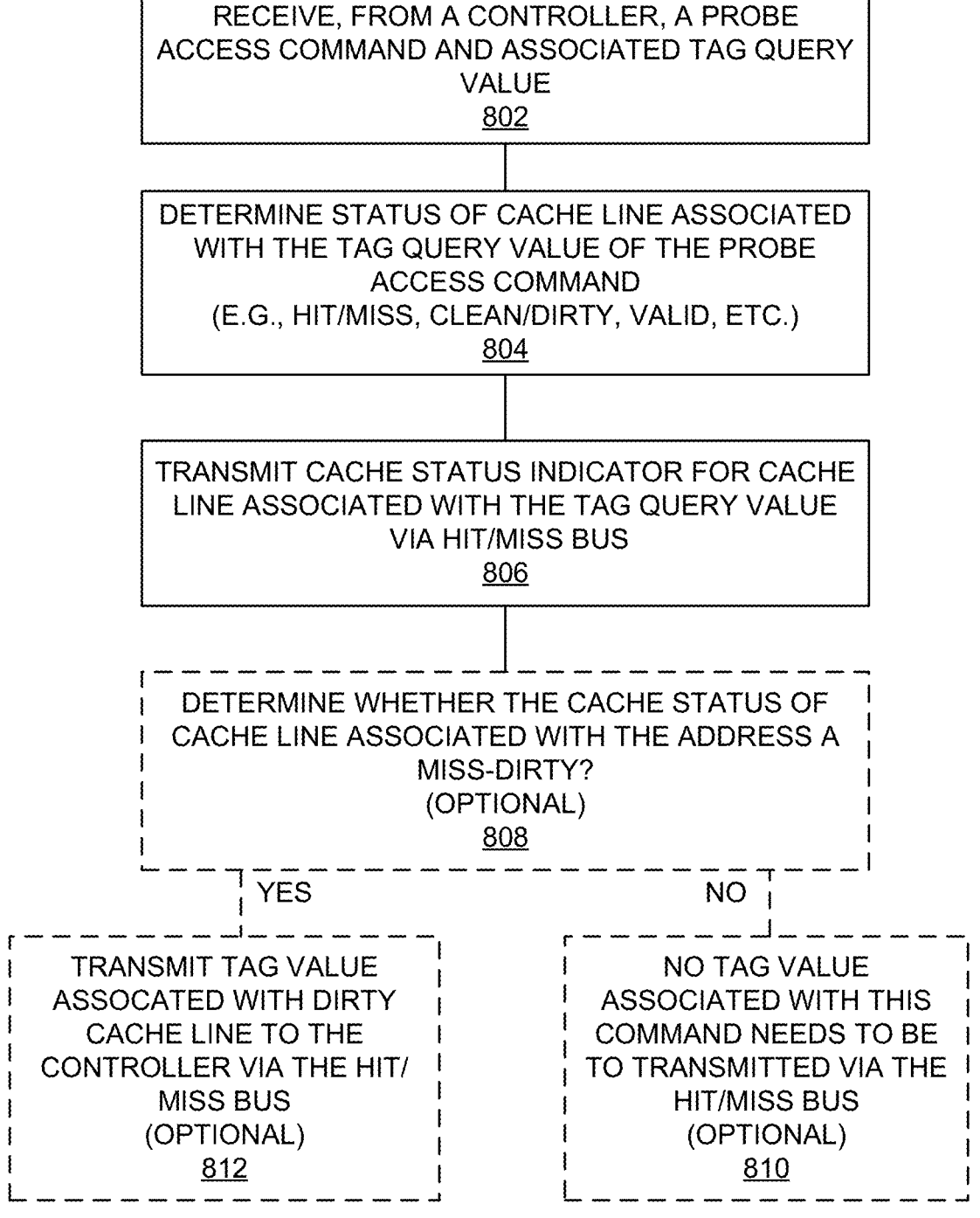

RECEIVE, FROM A CONTROLLER, A PROBE
ACCESS COMMAND AND ASSOCIATED TAG QUERY
VALUE
802

DETERMINE STATUS OF CACHE LINE ASSOCIATED
WITH THE TAG QUERY VALUE OF THE PROBE
ACCESS COMMAND
(E.G., HIT/MISS, CLEAN/DIRTY, VALID, ETC.)
804

TRANSMIT CACHE STATUS INDICATOR FOR CACHE
LINE ASSOCIATED WITH THE TAG QUERY VALUE
VIA HIT/MISS BUS
806

DETERMINE WHETHER THE CACHE STATUS OF
CACHE LINE ASSOCIATED WITH THE ADDRESS A
MISS-DIRTY?
(OPTIONAL)
808

YES

NO

TRANSMIT TAG VALUE
ASSOCATED WITH DIRTY
CACHE LINE TO THE
CONTROLLER VIA THE HIT/
MISS BUS
(OPTIONAL)
812

NO TAG VALUE
ASSOCIATED WITH THIS
COMMAND NEEDS TO BE
TO TRANSMITTED VIA THE
HIT/MISS BUS
(OPTIONAL)
810

*FIG. 8*

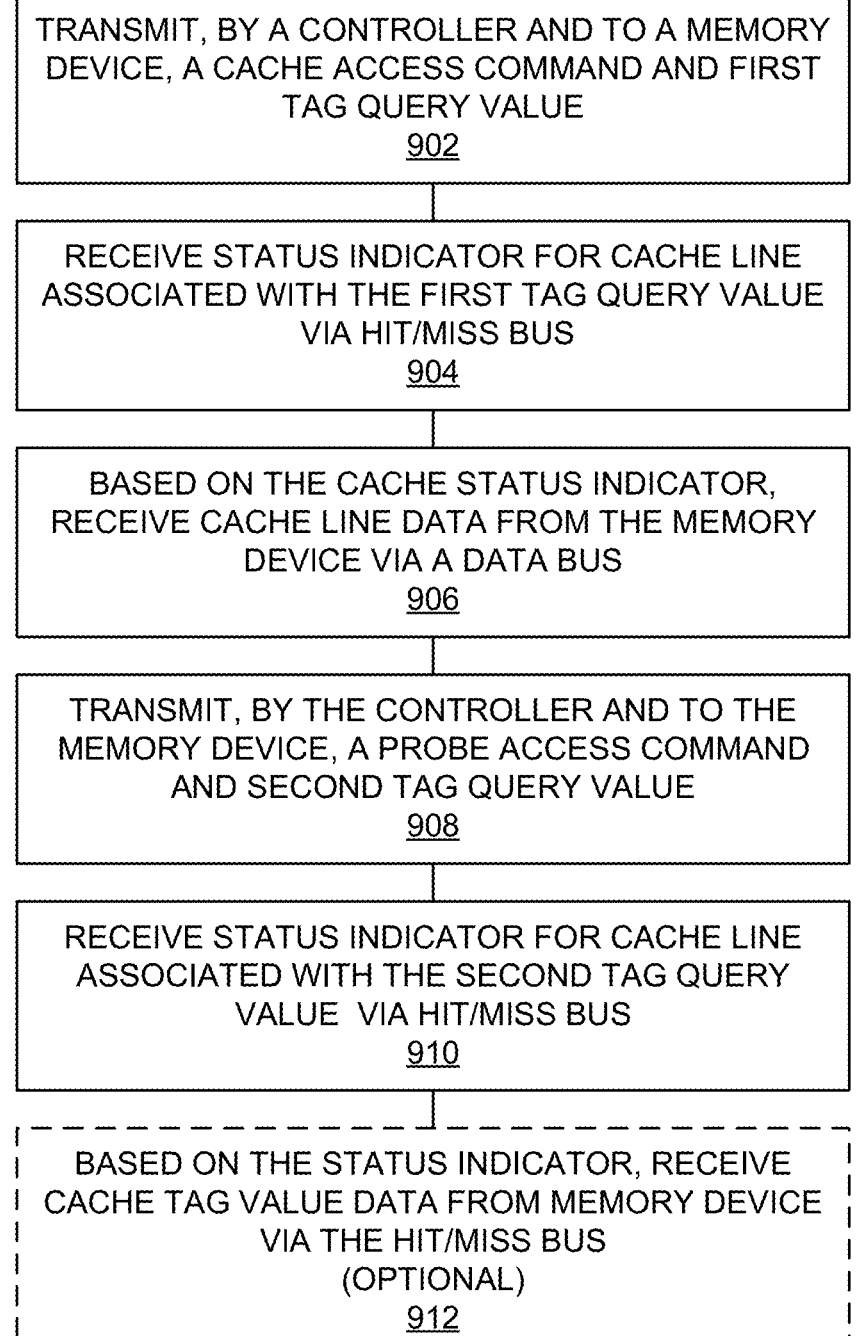

TRANSMIT, BY A CONTROLLER AND TO A MEMORY
DEVICE, A CACHE ACCESS COMMAND AND FIRST
TAG QUERY VALUE
902

RECEIVE STATUS INDICATOR FOR CACHE LINE
ASSOCIATED WITH THE FIRST TAG QUERY VALUE
VIA HIT/MISS BUS
904

BASED ON THE CACHE STATUS INDICATOR,
RECEIVE CACHE LINE DATA FROM THE MEMORY
DEVICE VIA A DATA BUS
906

TRANSMIT, BY THE CONTROLLER AND TO THE
MEMORY DEVICE, A PROBE ACCESS COMMAND
AND SECOND TAG QUERY VALUE
908

RECEIVE STATUS INDICATOR FOR CACHE LINE
ASSOCIATED WITH THE SECOND TAG QUERY
VALUE  VIA HIT/MISS BUS
910

BASED ON THE STATUS INDICATOR, RECEIVE
CACHE TAG VALUE DATA FROM MEMORY DEVICE
VIA THE HIT/MISS BUS
(OPTIONAL)
912

*FIG. 9*

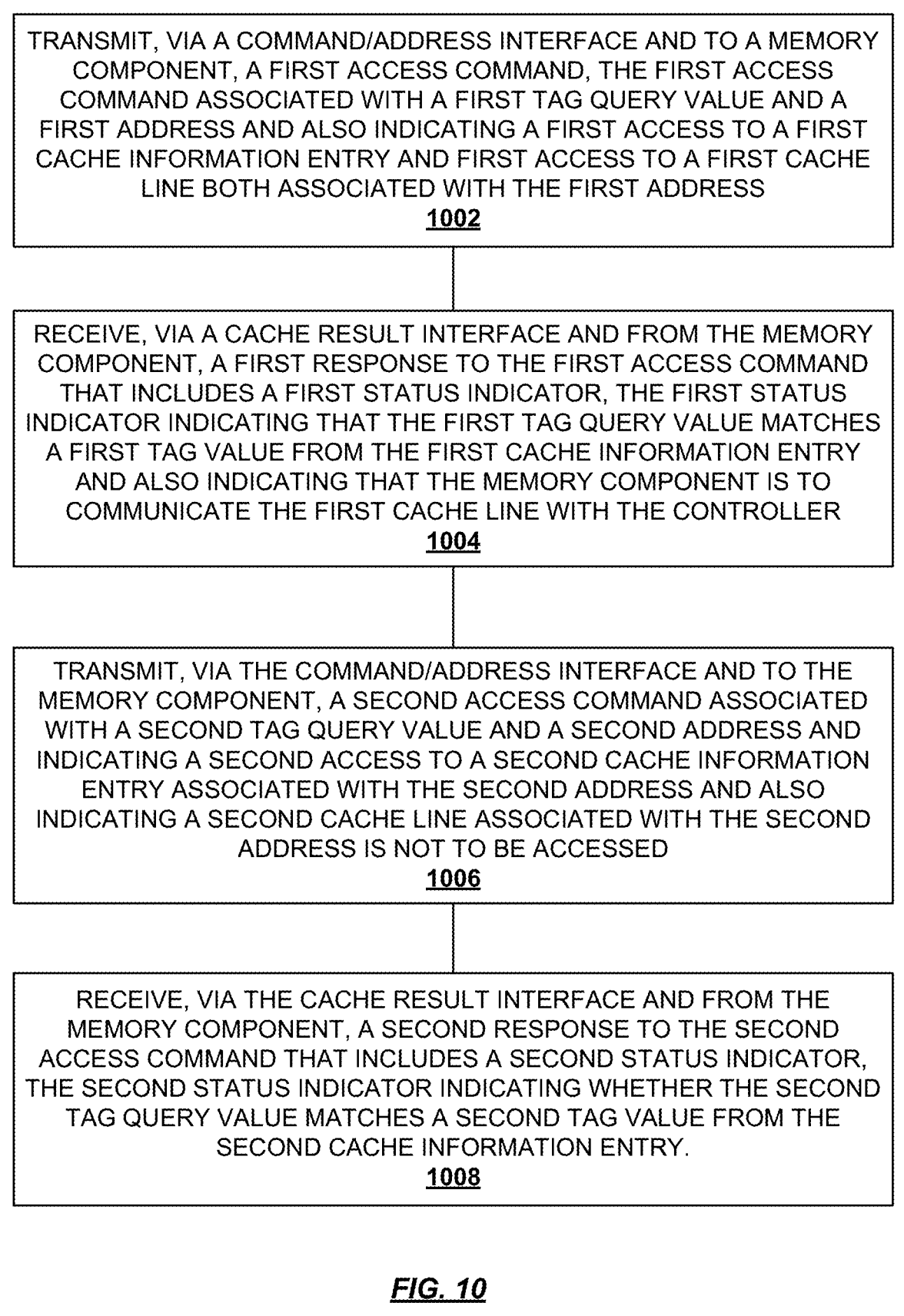

TRANSMIT, VIA A COMMAND/ADDRESS INTERFACE AND TO A MEMORY COMPONENT, A FIRST ACCESS COMMAND, THE FIRST ACCESS COMMAND ASSOCIATED WITH A FIRST TAG QUERY VALUE AND A FIRST ADDRESS AND ALSO INDICATING A FIRST ACCESS TO A FIRST CACHE INFORMATION ENTRY AND FIRST ACCESS TO A FIRST CACHE LINE BOTH ASSOCIATED WITH THE FIRST ADDRESS
1002

RECEIVE, VIA A CACHE RESULT INTERFACE AND FROM THE MEMORY COMPONENT, A FIRST RESPONSE TO THE FIRST ACCESS COMMAND THAT INCLUDES A FIRST STATUS INDICATOR, THE FIRST STATUS INDICATOR INDICATING THAT THE FIRST TAG QUERY VALUE MATCHES A FIRST TAG VALUE FROM THE FIRST CACHE INFORMATION ENTRY AND ALSO INDICATING THAT THE MEMORY COMPONENT IS TO COMMUNICATE THE FIRST CACHE LINE WITH THE CONTROLLER
1004

TRANSMIT, VIA THE COMMAND/ADDRESS INTERFACE AND TO THE MEMORY COMPONENT, A SECOND ACCESS COMMAND ASSOCIATED WITH A SECOND TAG QUERY VALUE AND A SECOND ADDRESS AND INDICATING A SECOND ACCESS TO A SECOND CACHE INFORMATION ENTRY ASSOCIATED WITH THE SECOND ADDRESS AND ALSO INDICATING A SECOND CACHE LINE ASSOCIATED WITH THE SECOND ADDRESS IS NOT TO BE ACCESSED
1006

RECEIVE, VIA THE CACHE RESULT INTERFACE AND FROM THE MEMORY COMPONENT, A SECOND RESPONSE TO THE SECOND ACCESS COMMAND THAT INCLUDES A SECOND STATUS INDICATOR, THE SECOND STATUS INDICATOR INDICATING WHETHER THE SECOND TAG QUERY VALUE MATCHES A SECOND TAG VALUE FROM THE SECOND CACHE INFORMATION ENTRY.
1008

*FIG. 10*

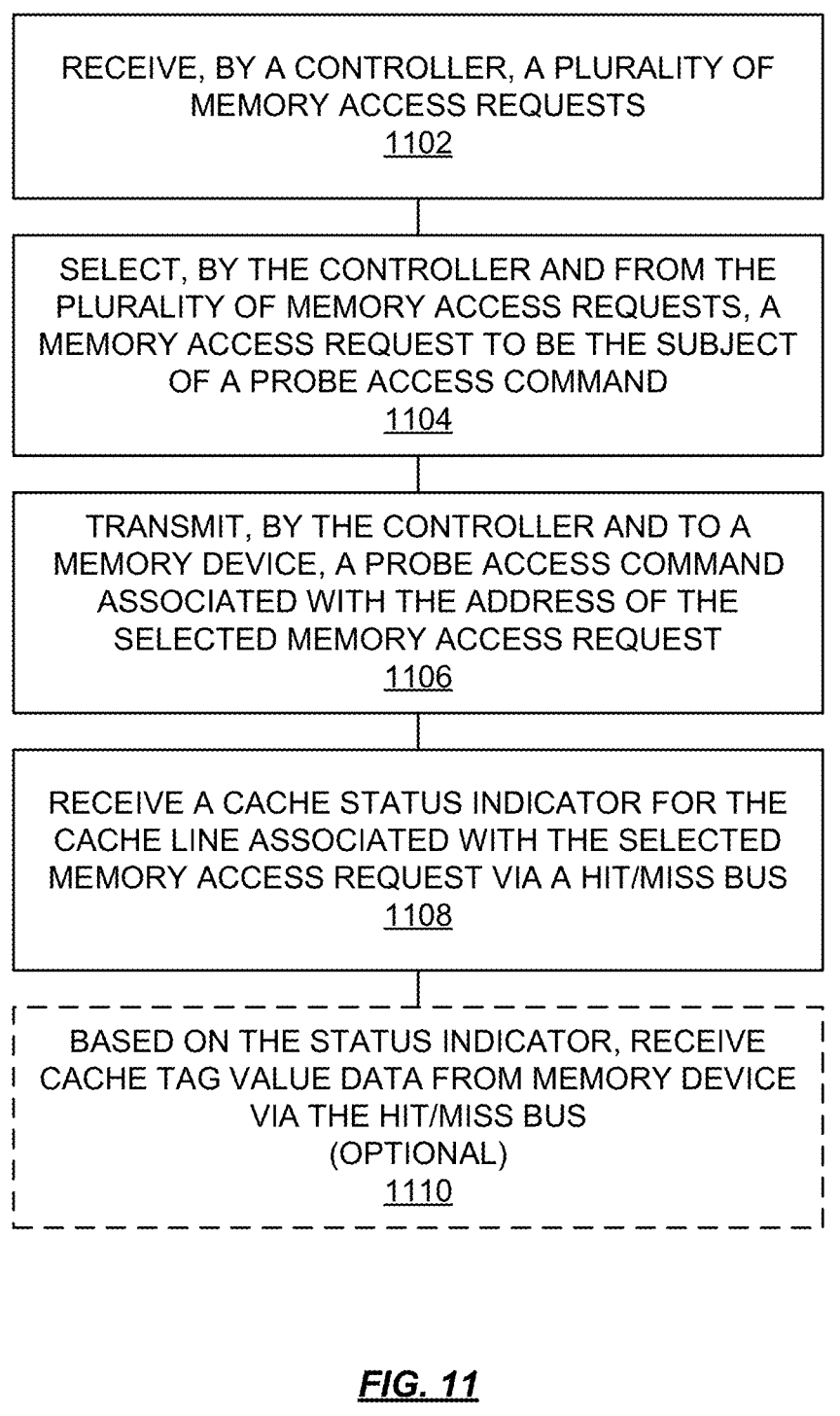

RECEIVE, BY A CONTROLLER, A PLURALITY OF MEMORY ACCESS REQUESTS
1102

SELECT, BY THE CONTROLLER AND FROM THE PLURALITY OF MEMORY ACCESS REQUESTS, A MEMORY ACCESS REQUEST TO BE THE SUBJECT OF A PROBE ACCESS COMMAND
1104

TRANSMIT, BY THE CONTROLLER AND TO A MEMORY DEVICE, A PROBE ACCESS COMMAND ASSOCIATED WITH THE ADDRESS OF THE SELECTED MEMORY ACCESS REQUEST
1106

RECEIVE A CACHE STATUS INDICATOR FOR THE CACHE LINE ASSOCIATED WITH THE SELECTED MEMORY ACCESS REQUEST VIA A HIT/MISS BUS
1108

BASED ON THE STATUS INDICATOR, RECEIVE CACHE TAG VALUE DATA FROM MEMORY DEVICE VIA THE HIT/MISS BUS
(OPTIONAL)
1110

*FIG. 11*

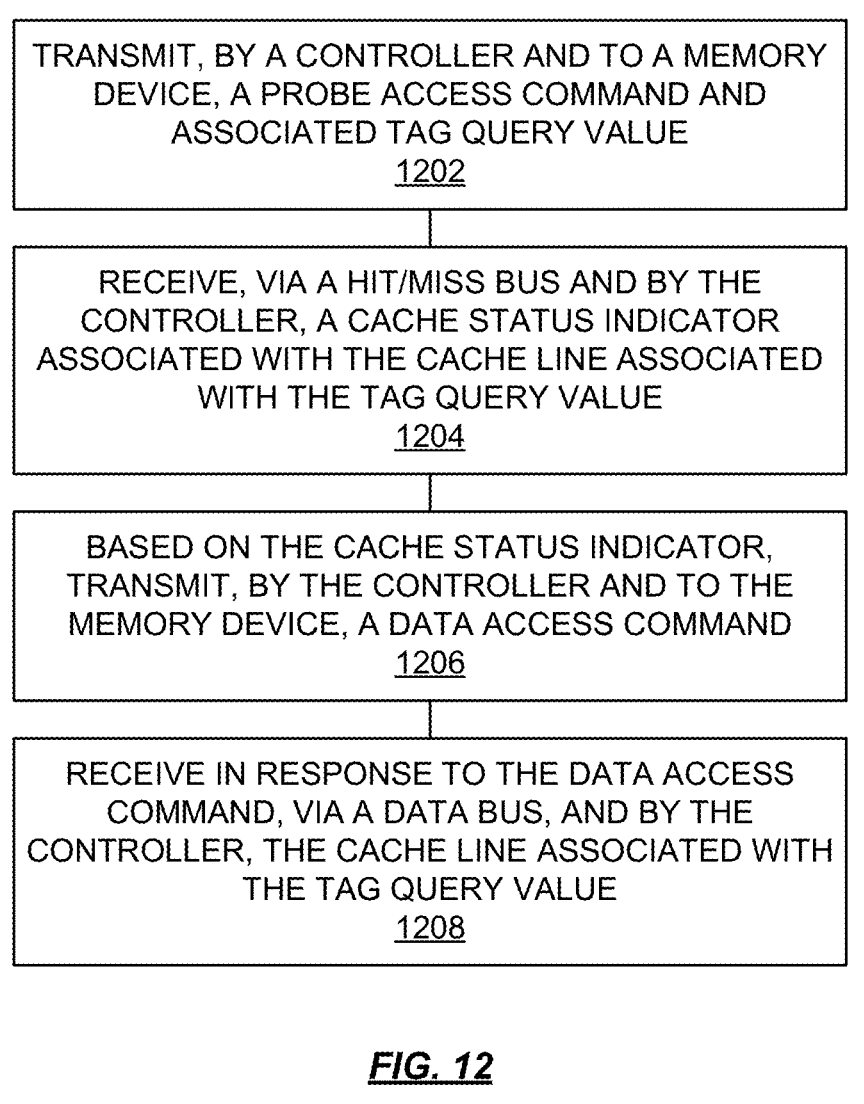

TRANSMIT, BY A CONTROLLER AND TO A MEMORY DEVICE, A PROBE ACCESS COMMAND AND ASSOCIATED TAG QUERY VALUE
1202

RECEIVE, VIA A HIT/MISS BUS AND BY THE CONTROLLER, A CACHE STATUS INDICATOR ASSOCIATED WITH THE CACHE LINE ASSOCIATED WITH THE TAG QUERY VALUE
1204

BASED ON THE CACHE STATUS INDICATOR, TRANSMIT, BY THE CONTROLLER AND TO THE MEMORY DEVICE, A DATA ACCESS COMMAND
1206

RECEIVE IN RESPONSE TO THE DATA ACCESS COMMAND, VIA A DATA BUS, AND BY THE CONTROLLER, THE CACHE LINE ASSOCIATED WITH THE TAG QUERY VALUE
1208

*FIG. 12*

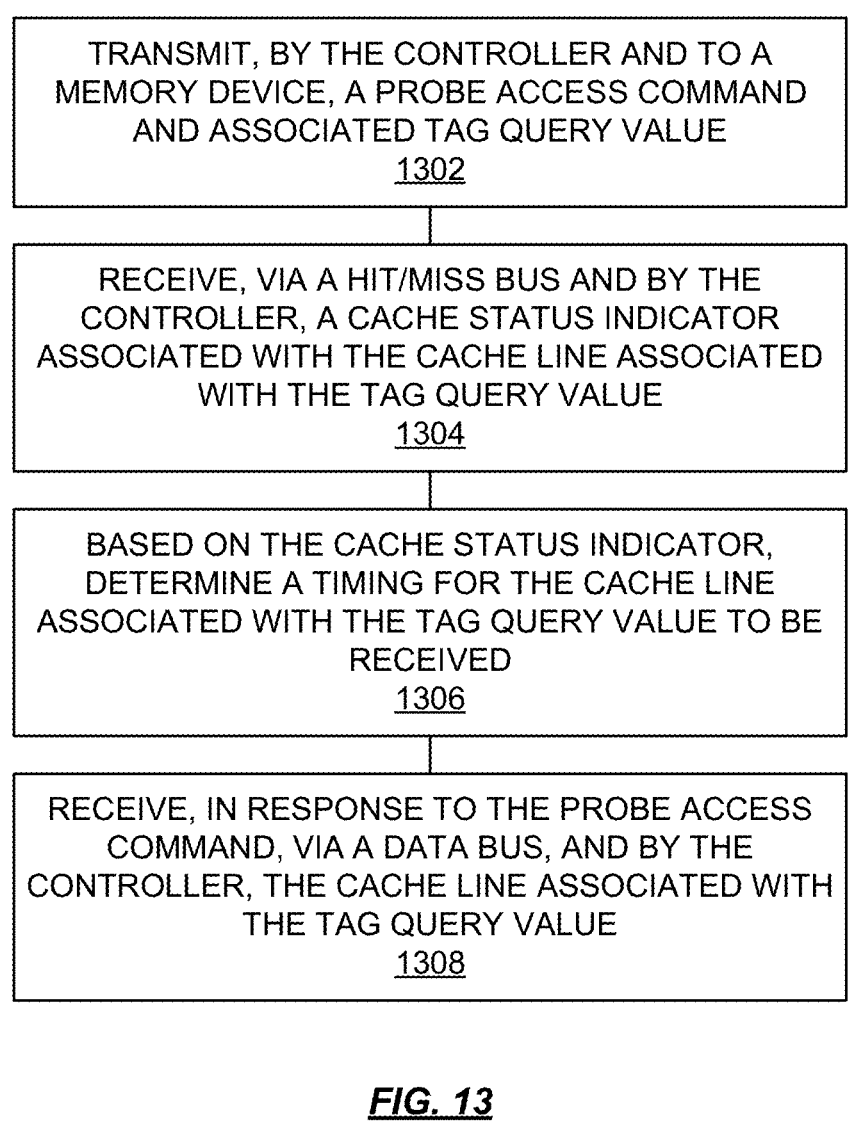

```
┌─────────────────────────────────────────────┐
│   TRANSMIT, BY THE CONTROLLER AND TO A        │
│  MEMORY DEVICE, A PROBE ACCESS COMMAND        │
│    AND ASSOCIATED TAG QUERY VALUE             │
│                  1302                          │
└─────────────────────────────────────────────┘
                     │
┌─────────────────────────────────────────────┐
│   RECEIVE, VIA A HIT/MISS BUS AND BY THE      │
│   CONTROLLER, A CACHE STATUS INDICATOR        │
│ ASSOCIATED WITH THE CACHE LINE ASSOCIATED     │
│     WITH THE TAG QUERY VALUE                  │
│                  1304                          │
└─────────────────────────────────────────────┘
                     │
┌─────────────────────────────────────────────┐
│   BASED ON THE CACHE STATUS INDICATOR,        │
│   DETERMINE A TIMING FOR THE CACHE LINE       │
│ ASSOCIATED WITH THE TAG QUERY VALUE TO BE     │
│                RECEIVED                        │
│                  1306                          │
└─────────────────────────────────────────────┘
                     │
┌─────────────────────────────────────────────┐
│  RECEIVE, IN RESPONSE TO THE PROBE ACCESS     │
│   COMMAND, VIA A DATA BUS, AND BY THE         │
│ CONTROLLER, THE CACHE LINE ASSOCIATED WITH    │
│        THE TAG QUERY VALUE                     │
│                  1308                          │
└─────────────────────────────────────────────┘
```

*FIG. 13*

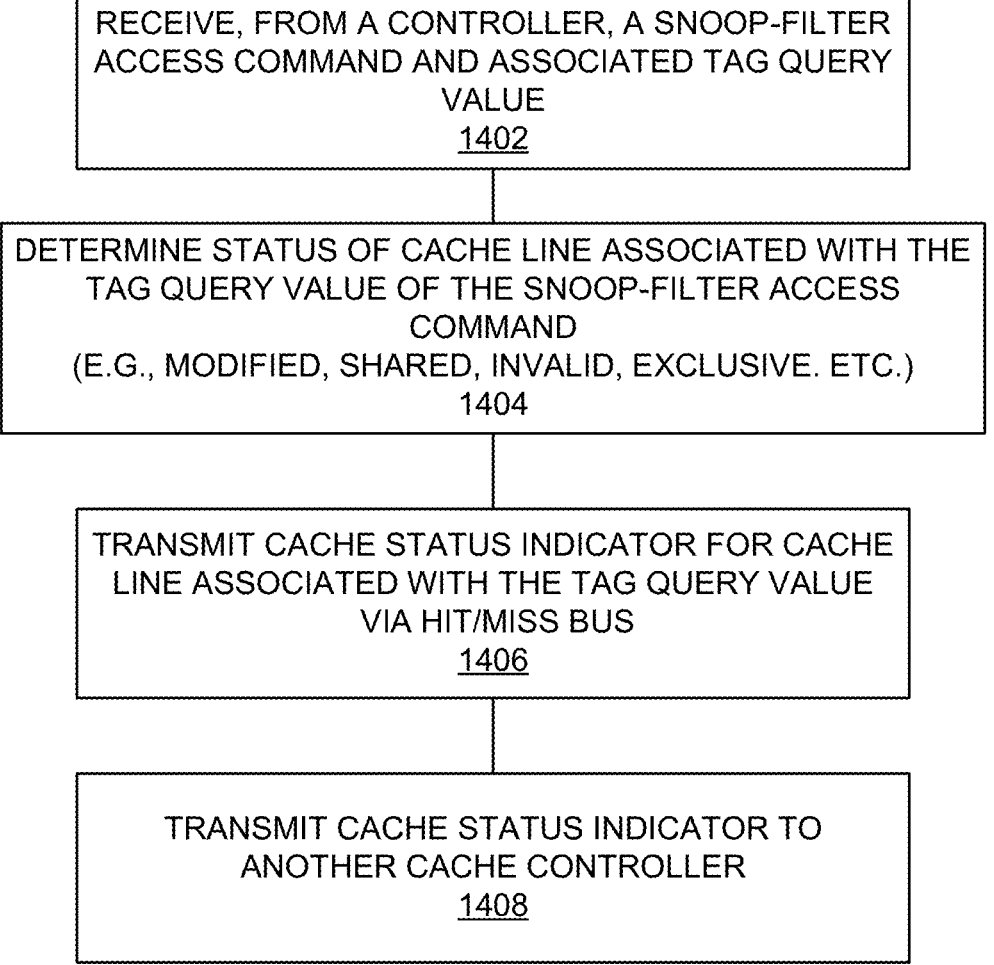

RECEIVE, FROM A CONTROLLER, A SNOOP-FILTER
ACCESS COMMAND AND ASSOCIATED TAG QUERY
VALUE
1402

DETERMINE STATUS OF CACHE LINE ASSOCIATED WITH THE
TAG QUERY VALUE OF THE SNOOP-FILTER ACCESS
COMMAND
(E.G., MODIFIED, SHARED, INVALID, EXCLUSIVE. ETC.)
1404

TRANSMIT CACHE STATUS INDICATOR FOR CACHE
LINE ASSOCIATED WITH THE TAG QUERY VALUE
VIA HIT/MISS BUS
1406

TRANSMIT CACHE STATUS INDICATOR TO
ANOTHER CACHE CONTROLLER
1408

*FIG. 14*

DRAM CACHE TAG PROBING

BRIEF DESCRIPTION OF THE DRAWINGS

FIGS. 6A-6B illustrate bus communications for an example sequence of probe access and cache data access commands.

FIG. 7 is a flowchart illustrating a method of performing a cache data access command.

FIG. 8 is a flowchart illustrating a method of performing a cache probe access command.

FIG. 9 is a flowchart illustrating a method of operating a memory controller.

FIG. 10 is a flowchart illustrating a method of accessing cache data and probing cache tag information.

FIG. 11 is a flowchart illustrating a method of responding to host memory access requests.

FIG. 12 is a flowchart illustrating a method of accessing cache line data.

FIG. 13 is a flowchart illustrating a method of receiving cache line data.

FIG. 14 is a flowchart illustrating a method of performing a cache probe access command.

DETAILED DESCRIPTION OF THE EMBODIMENTS

In an embodiment, a dynamic random access memory (DRAM) device includes functions configured to aid with operating the DRAM device as part of data caching functions. The DRAM is configured to respond to at least two types of commands. A first type of command (cache data access command) seeks to access a cache line of data, if present in the DRAM cache. A second type of command (cache probe command) seeks to determine whether a cache line of data is present, but is not requesting the data be returned in response. In response to these types of access commands, the DRAM device is configured to receive cache tag query values and to compare stored cache tag values with the cache tag query values. A hit/miss (HM) interface/bus may indicate the result of the cache tag compare and stored cache line status bits to a controller.

Figure 1:
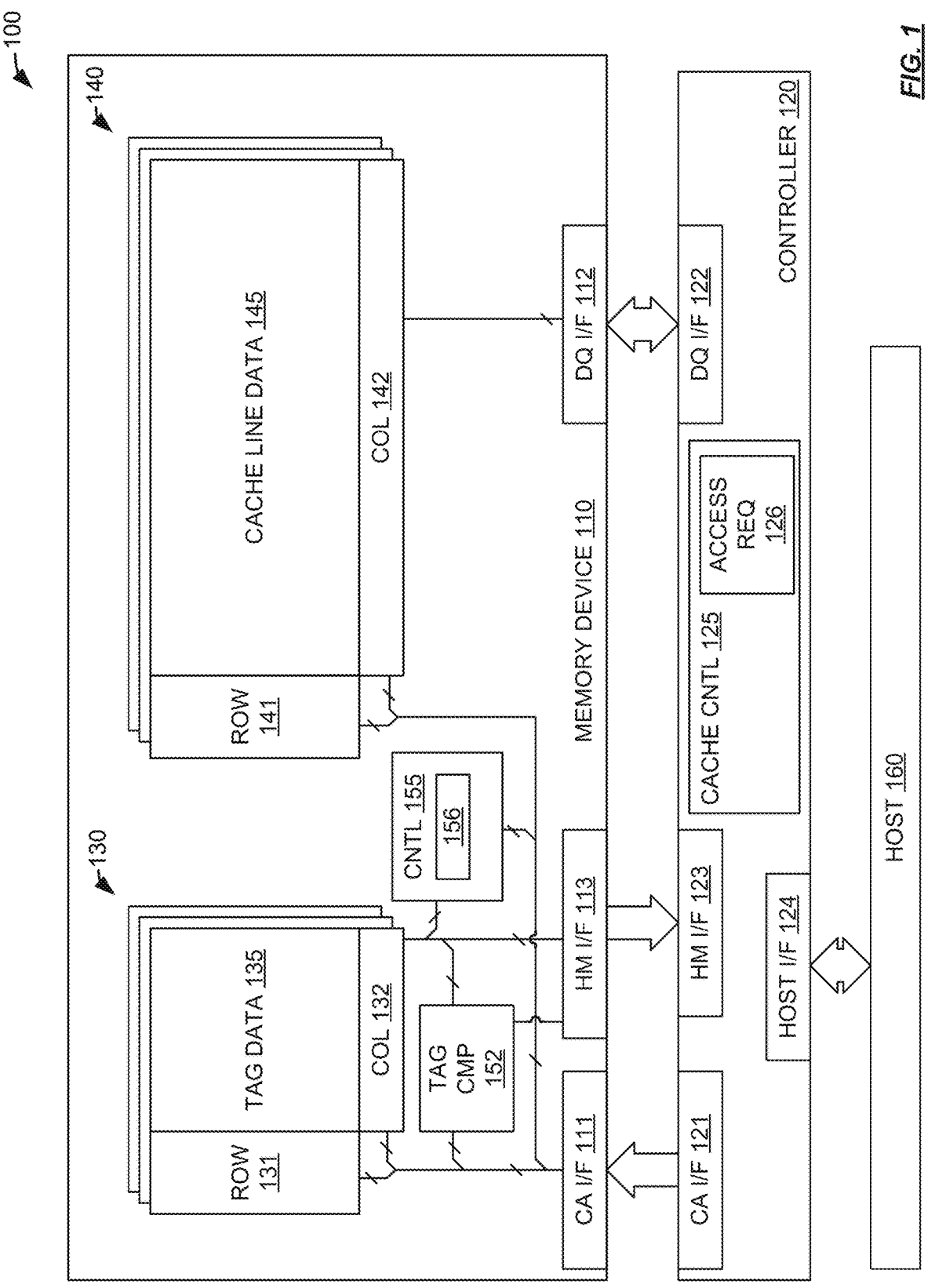
FIG. 1 is a block diagram illustrating a memory system.

FIG. 1 is a block diagram illustrating a memory system. In FIG. 1, memory system 100 comprises memory device 110, memory controller 120, and host 160. Memory device 110 includes command/address (CA) interface 111, data (DQ) interface 112, hit/miss (HM) interface 113, memory arrays (banks) 130, memory arrays (banks) 140, tag compare circuitry 152, and control circuitry 155. Control circuitry 155 includes registers 156. The rows and columns of each of memory banks 130 and memory banks 140 may be organized into rows and columns of memory array tiles (MATs). Each of memory banks 130 includes row circuitry 131, column circuitry 132, and a tag data storage array 135. Each of memory banks 140 includes row circuitry 141, column circuitry 142, and a cache line data storage array 145.

Tag data storage array 135 stores tag information entries corresponding to cache lines stored by cache line data storage array 145. Tag information entries stored by tag data storage array may include tag values and tag metadata. Tag metadata may include information related to the status of the tag information entry and/or the corresponding cache line stored by cache line data storage array 145. Information included in tag metadata may include, for example, whether the corresponding cache line is valid/invalid, clean/dirty, set associative replacement policy information (e.g., least recently used), and/or cache coherency state information (e.g., modified, exclusive, shared, owner, invalid, etc.).

In an embodiment, tag data storage array 135 may store tag information entries corresponding to cache lines fetched by the other cache memories to avoid unnecessary cache snooping operations. In an embodiment, memory device 110 and/or controller 120 may be configured to perform snoop-filtering operations/functions. A snoop-filter function and/or circuitry saves tag information (e.g., address, owner, state such as shared/exclusive/etc.) to avoid unnecessary snooping under multi-socket CPUs. In this configuration, some of the tag information in tag memory banks 130 may not be related to cache lines in data memory banks 140 of memory device 110 and is instead related to cache lines fetched by other CPU caches.

Memory controller 120 includes CA interface 121, DQ interface 122, hit/miss (HM) interface 123, host interface 124, and cache control circuitry 125. Cache control circuitry 125 includes access request circuitry 126. Host interface 124 of controller 120 is operatively coupled to host 160. Host 160 and/or controller 120 may be operatively coupled to additional cache levels (not shown in FIG. 1), main memory (not shown in FIG. 1), and/or backing store (not shown in FIG. 1).

CA interface 121 of controller 120 is operatively coupled to CA interface 111 of memory device 110. CA interface 121 of controller 120 is operatively coupled to CA interface 111 of memory device 110 to at least communicate, from controller 120, commands, addresses, and cache tag query values to memory device 110. DQ interface 122 of controller 120 is operatively coupled to DQ interface 112 of memory device 110. DQ interface 122 of controller 120 is operatively coupled to DQ interface 112 of memory device 110 to communicate data (e.g., cache lines, dirty cache lines, cache line fill data) between controller 120 and memory device 110. HM interface 123 of controller 120 is operatively coupled to HM interface 113 memory device 110. HM interface 123 of controller 120 is operatively coupled to HM interface 113 memory device 110 to at least communicate, from memory device 110, indicators of a cache tag compare result (i.e., hit or miss), and whether a cache access was to a clean or dirty cache line (e.g., cache flag indicators) to controller 120. In an embodiment, HM interface 123 of controller 120 is operatively coupled to HM interface 113 memory device 110 to, in some cases (e.g., when a "miss-dirty" occurs), communicate a tag value stored by tag data storage array 135 from memory device 110 to controller 120.

Memory controller 120 and memory device 110 may be integrated circuit type devices, such as are commonly referred to as "chips". A memory controller, such as memory controller 120, manages the flow of data going to and from memory devices and/or memory modules. Memory device 110 may be a standalone device, or may be a component of a memory module such as a DIMM module used in servers. Memory device 110 may be, or be part of, a component having a "stack" of memory devices. Memory device 110 may be a device that adheres to, or is compatible with, a dynamic random access memory (DRAM) specification. A memory controller can be a separate, standalone chip, or integrated into another chip. For example, a memory controller 120 may be included on a single die with a microprocessor, included as a chip co-packaged with one or more microprocessor chips, included as part of a more complex integrated circuit system such as a block of a system on a chip (SOC), or be remotely coupled to one or more microprocessors via a fabric interconnect or other type of interconnect.

CA interface 111 of memory device 110 is operatively coupled to the row circuitry 131 of each of memory banks 130, the column circuitry 132 of each of memory banks 130, and tag compare circuitry 152. CA interface 111 of memory device 110 is also operatively coupled to the row circuitry 141 of each of memory banks 140, the column circuitry 142 of each of memory banks 140, and control circuitry 155. CA interface 111 is operatively coupled to each of row circuitry 131 of memory banks 130 to at least to activate rows in one or more of memory banks 130. CA interface 111 is operatively coupled to the column circuitry 132 of each of memory banks 130 to at least sense values from activated rows, and to decode and provide the values of selected banks and columns to other circuitry of memory device 110 (e.g., tag compare circuitry 152, tag error detection and correction (EDC) circuitry, DQ interface 112, etc.) CA interface 111 is operatively coupled to the column circuitry 132 of each of memory banks 130 to at least allow accessing of tag information entries stored in the tag data storages arrays 135 of memory banks 130 and to at least provide tag compare circuitry 152 with stored tag values from the tag data storages arrays 135 of memory banks 130. CA interface 111 is operatively coupled to tag compare circuitry 152 to at least provide tag compare circuitry 152 with tag query values indicated by commands.

CA interface 111 is operatively coupled to each of row circuits 141 of memory banks 140 to at least activate rows in one or more of memory banks 140. CA interface 111 is operatively coupled to the column circuitry 142 of each of memory banks 140 to at least sense values from activated rows, and to decode and provide the values of selected banks and columns to other circuitry of memory device 110 (e.g., data EDC circuitry, DQ interface 112, etc.) CA interface 111 is operatively coupled to the column circuitry 142 of each of memory banks 140 to at least allow accessing of cache line data stored in the cache line data storages arrays 145 of memory banks 140 and to at least communicate cache line data with DQ interface 112.

Column circuitry 132 and column circuitry 142 may have different decoding functions. For example, the different decoding functions performed by column circuitry 132 and column circuitry 142 may allow different arrangements of data and/or EDC information (i.e., fields) between memory banks 130 and memory banks 140. Column circuitry 132 may decode a column address and provide the addressed cache tags and metadata to tag compare circuitry 152 and tag EDC information to tag EDC circuitry (not shown in FIG. 1). Similarly, column circuitry 142 may decode a column address and provide the addressed data EDC information and the cache line data to data EDC circuitry (not shown in FIG. 1), and also provide just the cache line data to DQ interface 112.

Figure 2:
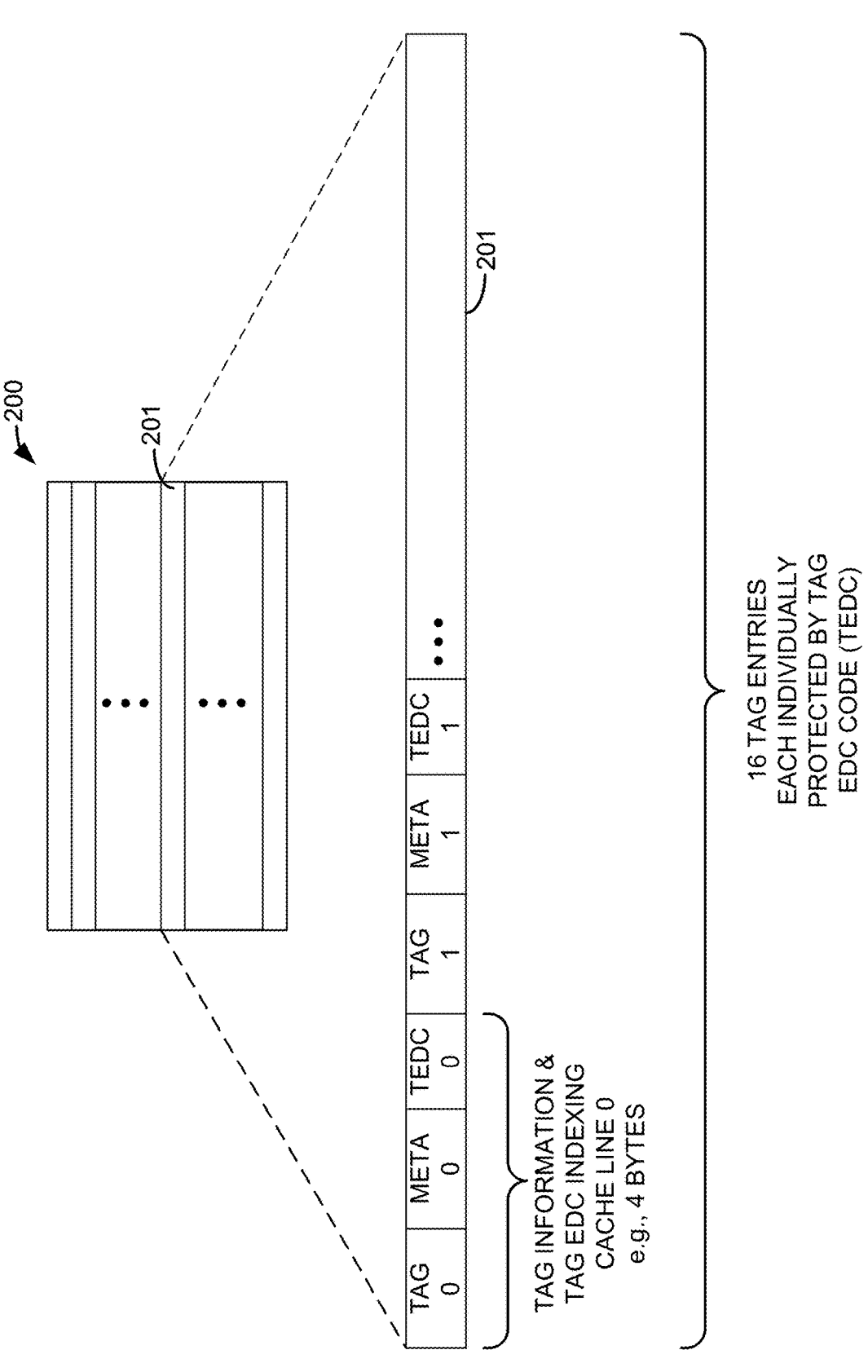
FIG. 2 is a diagram illustrating an example placement of tag information in a row of a dynamic random access memory (DRAM) bank.

FIG. 2 is a diagram illustrating an example placement of tag information in a row of a dynamic random access memory (DRAM) bank. In FIG. 2, the data placement of cache tags, cache metadata, and cache EDC information into the rows of a memory bank 200 (e.g., each of memory banks

130) is illustrated. In particular, the example data placement into row 201 of memory bank 200 is illustrated. In FIG. 2, the tag, metadata, and tag EDC information for the cache lines stored in row 201 is illustrated starting at the leftmost position in row 201 starting with the tag (TAG0), metadata (META 0), and EDC information (TEDC0) for cache line 0, then proceeding to the next position to the right with the tag (TAG1), metadata (META 1), and EDC information (TEDC1) for cache line 1, and so on.

Figure 3:
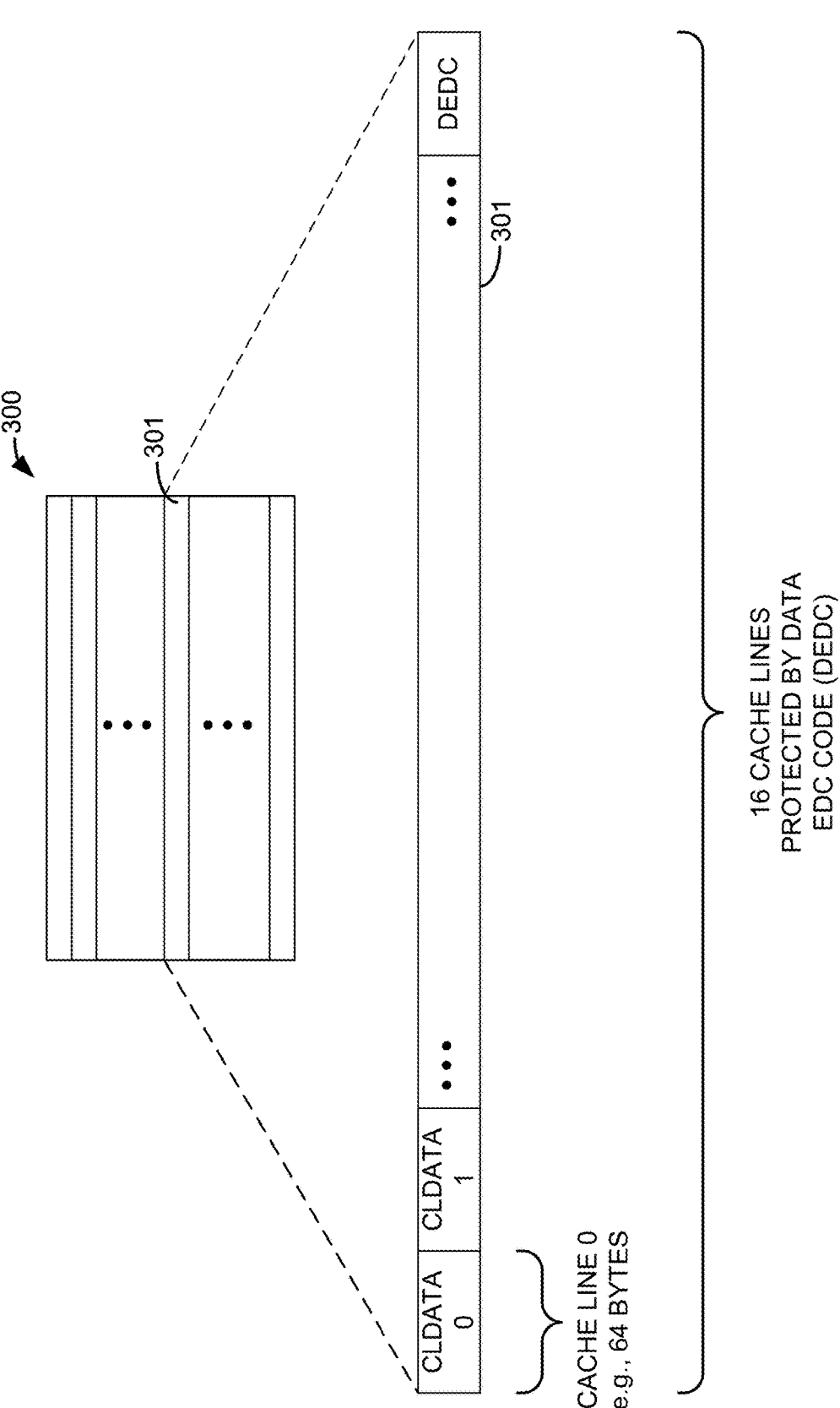
FIG. 3 is a diagram illustrating an example placement of cache line data in a row of DRAM bank.

FIG. 3 is a diagram illustrating an example placement of cache line data in a row of DRAM bank. In FIG. 3, the data placement of cache line data and data EDC information into the rows of a memory bank 300 (e.g., each of memory banks 140) is illustrated. In particular, the example data placement into row 301 of memory bank 300 is illustrated. In FIG. 3, the cache lines stored in row 301 is illustrated starting at the leftmost position in row 301 with the data for cache line 0 (CLDATA0). To the right of cache line 0 is the data for cache line 1 (CLDATA1), and so on. To the right of the cache line data stored in row 301, is the data EDC information (DEDC). The data EDC information is illustrated in the rightmost locations of row 301. In another embodiment, rather than having each cache line completely contained in a single bank, cache lines may be split across multiple banks 140 and the multiple banks 140 operated together to access entire cache lines (and data EDC information). Thus, in this embodiment, the amount of a cache line stored in each row may be adjusted appropriately (e.g., 4 bytes of cache line data per row, per each bank of 16 banks).

Returning now to FIG. 1, CA interface 121 of memory controller 120 is operatively coupled to CA interface 111 of memory device 110. CA interface 121 is operatively coupled to CA interface 111 to communicate commands, addresses (e.g., row and column addresses), and tag query values from memory controller 120 to memory device 110. In an embodiment, the commands communicated from memory controller 120 to memory device 110 include traditional row operations (e.g., activate and refresh), column operations (e.g., read and write), at least one command that combines row and column operations to access a one of memory banks 130 and a corresponding one of memory banks 140 (cache data access commands), and at least one command to access a one of memory banks 130 without further accessing the corresponding one of memory banks 140 (probe access commands).

To illustrate, for example, controller 120 may transmit, and memory device 110 receive, a cache data access command that activates an addressed row in one (or more, in some embodiments) of memory banks 130 and a corresponding bank and row in memory banks 140; reads the addressed data columns (which may be different between memory banks 130 and memory banks 140 due to different data decoding between column circuitry 132 and column circuitry 142) from the activated rows; compares (e.g., by tag compare circuitry 152) a tag value retrieved from the addressed one of memory banks 130 to a tag query value specified by the command (hereinafter, e.g., an Activate-Read command—ACTRD or an Activate-Write—ACTWR); provides a result based on the compare and/or other cache tag fields (e.g., valid) to HM interface 113 for transmission to controller 120; and, based on the command (e.g., read or write) and result, may provide the data from the addressed columns of the addressed one of memory banks 140 to DQ interface 112 for transmission to controller 120. Also, in an embodiment, in the case of an ACTWR command, write data may be received via DQ interface 112 to be stored in the addressed one of memory banks 140. Whether the data from the addressed columns of the addressed one of memory banks 140 to DQ interface 112 is transmitted to controller 120, or whether data is received for storage by the addressed one of memory banks 140, may be based on a mode indicator (e.g., in control 155) and/or an indicator that is part of the ACTWR command.

In addition, for example, controller 120 may transmit, and memory device 110 receive, a probe access command that activates an addressed row in addressed one (or more, in some embodiments) of memory banks 130 but does not activate a corresponding bank and row in memory banks 140; reads the addressed data columns from the activated row; compares (e.g., by tag compare circuitry 152) a tag value and metadata retrieved from the addressed one of memory banks 130 to a tag query value specified by the command (hereinafter, e.g., a Probe-Read command—PR-BRD); and provides a result based on the compare and/or other cache tag fields (e.g., valid) to HM interface 113 for transmission to controller 120 without providing data to be transmitted to controller 120 via DQ interface 112. Thus, it should be understood that probe access commands (e.g., PRBRD) may be used to query the status (e.g., hit/miss, clean/dirty, valid/invalid, exclusive/shared, etc.) of cache line entries stored by memory device 110 without using bandwidth (e.g., time slots) on the bus coupled to DQ interface 112 to communicate the cache line data associated with the cache line entry. This preserves data bus (DQ) bandwidth to be used for other purposes (e.g., communicating cache line data in response to cache data access commands—e.g., ACTRD or ACTWR).

In an embodiment, controller 120 may transmit, to memory device 110 and via CA interface 121 and CA interface 111, a PRBRD command to query the status of a cache line using the contents of an addressed row of one of memory banks 130. A cache tag query value is also transmitted in association with the PRBRD command. Table 1 illustrates an example command/address/tag encoding for an example PRBRD command. In Table 1: "R" stands for rising edge of the clock; "F" stands for the falling edge of the clock; the tag query value is specified by the bits T0-T17 (or less); the column address is specified by the bits CA0-CA10 (or less); the bank address is specified by bits BA0-BA4 (or less); and the row address is specified by RA0-RA15 (or less).

110 at the specified address (row, bank, and column), and optionally determine the status of the line (e.g., clean/dirty, exclusive/shared), if present. In response to the probe access command, memory device 110 activates the addressed row into row sense amplifiers (e.g., in the addressed one of memory banks 130), selects those columns associated with the received column address, and provides the stored values at those addressed columns to at least tag compare circuitry 152.

If tag compare circuitry 152 finds the tag query value matches (i.e., is equal to) the stored tag value in the addressed one of memory banks 130 at the address communicated by (or in association with) the probe access command, and the "valid" flag indicates the cache entry is valid, it is termed a cache "hit" and the cache line that cache control circuitry 125 is seeking to read from memory device 110 is present and valid in the addressed one of memory banks 130. Based on the cache hit, memory device 110 transmits a "hit" indicator to controller 120 via HM interface 113 and HM interface 123. A "dirty" or "clean" indicator may also be communicated based on a hit to designate "clean-hit" or "dirty hit". Other cache tag information, such as shared/exclusive may also be communicated based on a hit.

In an embodiment, control circuitry 155 may store all or part of the tag information and/or results (e.g., an indicator of the cache way that hit in a set associative cache scheme) of the probe access in registers 156. In an embodiment, if controller 120 later transmits an access command to retrieve the cache line that was the subject of the hit, memory device 110 can use the information in registers 156 to avoid an unnecessary/duplicated tag data storage array access. In an embodiment, memory device 120 may later use the information in registers 156 to access from memory banks 140, and then transmit, to controller 120, the cache line that was the subject of the hit at a time agreed upon with controller 120. In an embodiment, memory device 120 may later use the information in registers 156 to access from memory banks 140, and then store in a flush buffer, for later transmission to controller 120, the cache line that was the subject of the hit.

If tag compare circuitry 152 finds the tag query value does not match the stored tag value in memory banks 130 at the row and column addresses communicated by (or in associa-

TABLE 1

| CMD | CK | CA0 | CA1 | CA2 | CA3 | CA4 | CA5 | CA6 | CA7 | CA8 | CA9 | CA10 |
|---|---|---|---|---|---|---|---|---|---|---|---|---|
| Probe- | R | L | H | H | L | SID0/V | SID1/V | BA0 | BA1 | BA2 | BA3 | BA4 |
| Read | F | H | H | L | RA8 | RA9 | RA10 | RA11 | RA12 | RA13/V | RA14 | RA15 |
| (PRBRD) | | | | | | | | | | | V | V |
| | R | H | H | RA0 | RA1 | RA2 | RA3 | RA4 | RA5 | RA6 | RA7 | V |
| | F | H | H | H | H | H | CA0 | CA1 | CA2 | CA3 | CA4 | CA5 |
| | R | H | H | T0 | T1 | T2 | T3 | T4 | T5 | T6 | T7 | T8 |
| | F | H | L | T9 | T10 | T11 | T12 | T13 | T14 | T15 | T16 | T17 |

Figure 4:
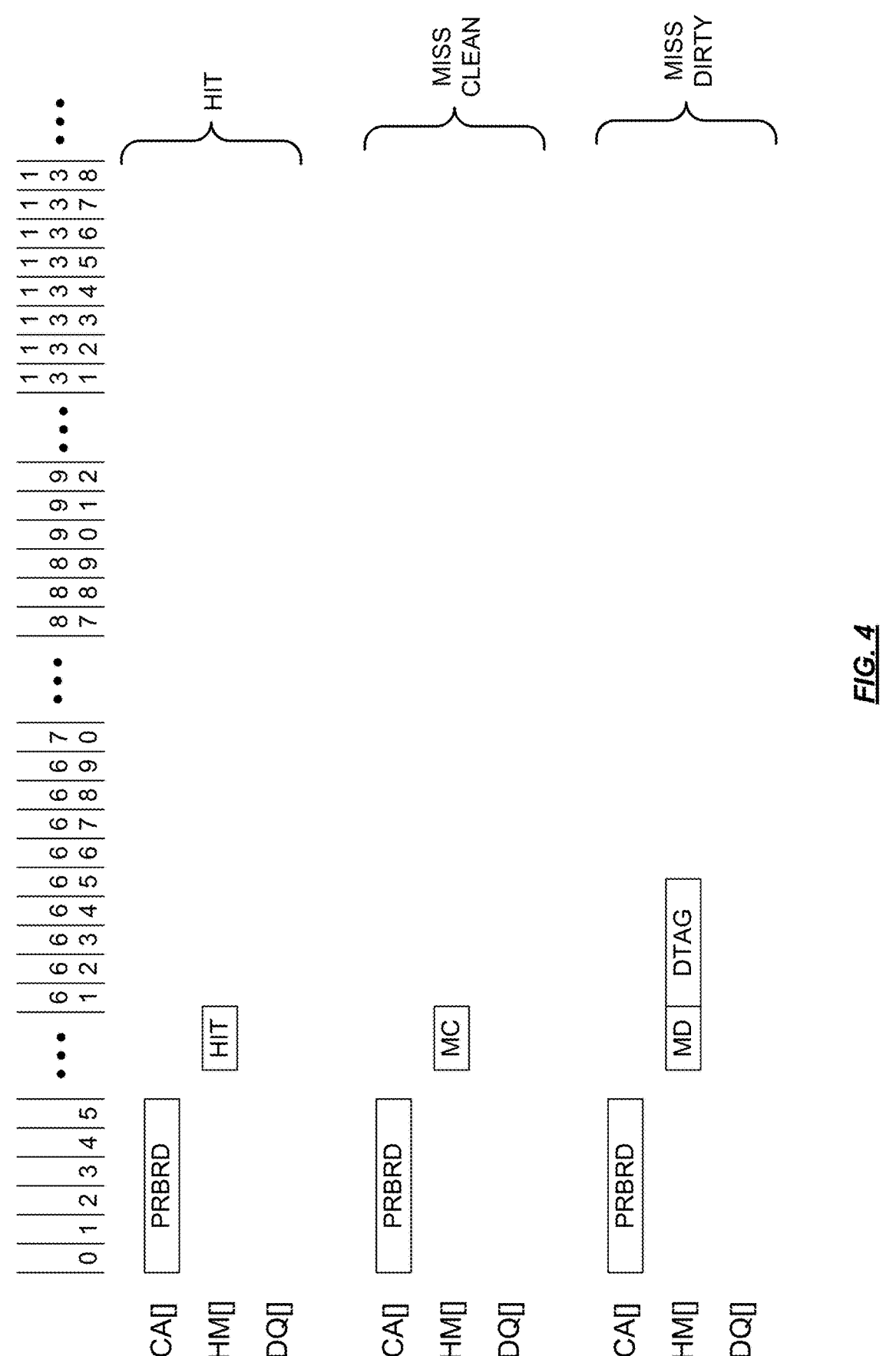
FIG. 4 illustrates example bus communications for probe access commands.

In an embodiment, cache control circuitry 125 may control memory controller 120 to issue a cache probe operation in the form of a probe access type combined column and row command (e.g., PRBRD). In addition to a row address and column address (e.g., decoded by row circuitry 131 and column circuitry 132, respectively), the probe access command communicates a tag query value (e.g., T0-T17). In other words, the tag query value corresponds to a tag value that the cache access operation is seeking to compare to a stored tag value to determine whether the cache line corresponding to the tag query value is present in memory device tion with) the probe access command, and the "valid" flag indicates the cache entry is valid, it is termed a cache "miss" and the cache line that cache control circuitry 125 is querying memory device 110 for its status is not present in memory banks 140. If the tag query value and stored tag value did not match (and are valid), and the "dirty" flag indicates the corresponding cache line data has not been altered, the miss is termed a "miss clean". Based on the miss clean, memory device 110 transmits a "miss clean" indicator to controller 120 via HM interface 113 and HM interface 123. Note, however, that regardless of the cache status associated with the probe access command, the associated cache line is not communicated via DQ interface 112. This is further illustrated in FIG. 4 where the cache status (and optionally other information—e.g., dirty tag value for a "dirty-miss") is communicated via HM interface 113 for a variety of cache status's illustrated, but no data is communicated via DQ interface 112.

In an embodiment, controller 120 may transmit, to memory device 110 and via CA interface 121 and CA interface 111, an ACTRD or ACTWR command to access a cache line, if present in the addressed one of memory banks 140 and its associated tags in the corresponding one of memory banks 130 for reading or writing the cache line, respectively. A cache tag query value is also transmitted in association with the ACTRD and ACTWR commands. Table 2 illustrates an example command/address/tag encoding for an example ACTRD command (an ACTWR may have a similar encoding). In Table 2: "R" stands for rising edge of the clock; "F" stands for the falling edge of the clock; the tag query value is specified by the bits T0-T17 (or less); the column address is specified by the bits CA0-CA10 (or less); the bank address is specified by bits BA0-BA4 (or less); and the row address is specified by RA0-RA15 (or less).

transmits a "hit" indicator to controller 120 via HM interface 113 and HM interface 123. A "dirty" or "clean" indicator may also be communicated based on a hit to designate "clean-hit" or "dirty hit". Other cache tag information, such as shared/exclusive may also be communicated based on a hit. If the access was a read operation and based on the cache hit, memory device 110 transmits, via DQ interface 112 and DQ interface 122, the corresponding cache line data from memory banks 140 to controller 120.

If the "valid" flag indicates the cache entry is not valid, any compare of the tag query value and stored tag value is also not valid (i.e., "miss-invalid"). Based on the miss invalid determination, memory device 110 transmits an "invalid" indicator to controller 120 via HM interface 113 and HM interface 123. If the access was a read operation, and based on the "invalid" indicator, controller 120 may later issue a command and provide data to replace (or "fill"), in memory banks 130, the cache line entry corresponding to the tag query value that was directed to the invalid entry. Also based on the miss-invalid, memory device 110 may, in some embodiments, not transmit the corresponding cache line data to controller 120, may transmit an undefined

TABLE 2

| CMD | CK | CA0 | CA1 | CA2 | CA3 | CA4 | CA5 | CA6 | CA7 | CA8 | CA9 | CA10 |
|---|---|---|---|---|---|---|---|---|---|---|---|---|
| Activate- | R | L | H | H | L | SID0/V | SID1/V | BA0 | BA1 | BA2 | BA3 | BA4 |
| Read | F | H | H | L | RA8 | RA9 | RA10 | RA11 | RA12 | RA13/V | RA14 | RA15 |
| (ACTRD) | | | | | | | | | | | V | V |
| | R | H | H | RA0 | RA1 | RA2 | RA3 | RA4 | RA5 | RA6 | RA7 | V |
| | F | H | L | H | L | L | CA0 | CA1 | CA2 | CA3 | CA4 | CA5 |
| | R | H | H | T0 | T1 | T2 | T3 | T4 | T5 | T6 | T7 | T8 |
| | F | H | L | T9 | T10 | T11 | T12 | T13 | T14 | T15 | T16 | T17 |

In an embodiment, cache control circuitry 125 may control memory controller 120 to issue a cache access operation in the form of a cache data access command (e.g., ACTRD or ACTWR). In addition to a row address (e.g., decoded by row circuitry 131 and row circuitry 141) and column address (e.g., decoded by column circuitry 132 and column circuitry 142), the cache access command communicates a tag query value (e.g., T0-T17). In other words, the tag query value corresponds to a tag value that the cache access operation is seeking to compare to a stored tag value (from one of memory banks 130) to determine whether the cache line corresponding to the tag query value is present in memory device 110 at the specified address (row, bank, and column) in memory banks 140. In response to the cache access command, memory device 110 activates the addressed row into row sense amplifiers in the addressed one of memory banks 130 and corresponding one of memory banks 140, respectively selects those columns associated with the received column address, provides the stored values at the addressed columns 132 to at least tag compare circuitry 152, and, for a read, provides the stored values at the addressed columns 142 to data interface 112, and, for a write, receives write data from data interface 112 and provides it to the addressed columns 142.

If tag compare circuitry 152 finds the tag query value matches (i.e., is equal to) the stored tag value from memory banks 130 at the address communicated by (or in association with) the cache access command, and the "valid" flag indicates the cache entry is valid, it is a cache "hit" and the cache line that cache control circuitry 125 is seeking to read from memory device 110 is present and valid in memory banks 140. Based on the cache hit, memory device 110 response, and/or may transmit data associated with a different command (e.g., from a flush buffer).

If tag compare circuitry 152 finds the tag query value does not match the stored tag value in memory banks 130 at the row and column addresses communicated by (or in association with) the cache read command, and the "valid" flag indicates the cache entry is valid, it is termed a cache "miss" and the cache line that cache control circuitry 125 is seeking to read from memory device 110 is not present in memory banks 140. If the tag query value and stored tag value did not match (and are valid), and the "dirty" flag indicates the corresponding cache line data has not been altered, the miss is termed a "miss clean". Based on the miss clean, memory device 110 transmits a "miss clean" indicator to controller 120 via HM interface 113 and HM interface 123.

If the access was a read operation, and based on the miss clean, memory device 110 may, in some embodiments, not transmit the corresponding cache line data to controller 120, may transmit an undefined response, and/or may transmit data associated with a different command (e.g., from a flush buffer). Controller 120 may, based on a cache allocation policy (or mode) of memory device 110 and/or memory system 100, later issue a command and provide data to replace (or "fill"), in memory banks 130 and memory banks 140, the tag and flag information and cache line entry corresponding to the tag query value that resulted in a miss clean.

If, (1) the "valid" flag indicates the cache entry is valid, and (2) tag query value and stored tag value did not match and (3) the "dirty" flag indicates the corresponding cache line data has been altered, the miss is termed a "miss dirty". Based on the miss dirty, memory device 110 transmits a "miss dirty" indicator to controller 120 via HM interface 113 and HM interface 123. If the access was a read operation, and based on the miss dirty, memory device 110 transmits, via DQ interface 112 and DQ interface 122, the corresponding altered (a.k.a., "dirty") cache line data (e.g., from data column circuitry group 132*d* and/or data EDC circuitry 143) to controller 120. Further based on the miss dirty, memory device 110 may transmit the nonmatching stored tag value corresponding to the dirty cache line data to controller 120 via HM interface 113 and HM interface 123. Controller 120 may, based on a cache allocation policy (or mode), later issue a command and provide data to replace (or "fill"), in memory banks 130 and memory banks 140, the tag and flag information and cache line entry corresponding to the tag query value that resulted in the miss dirty.

Figure 5:
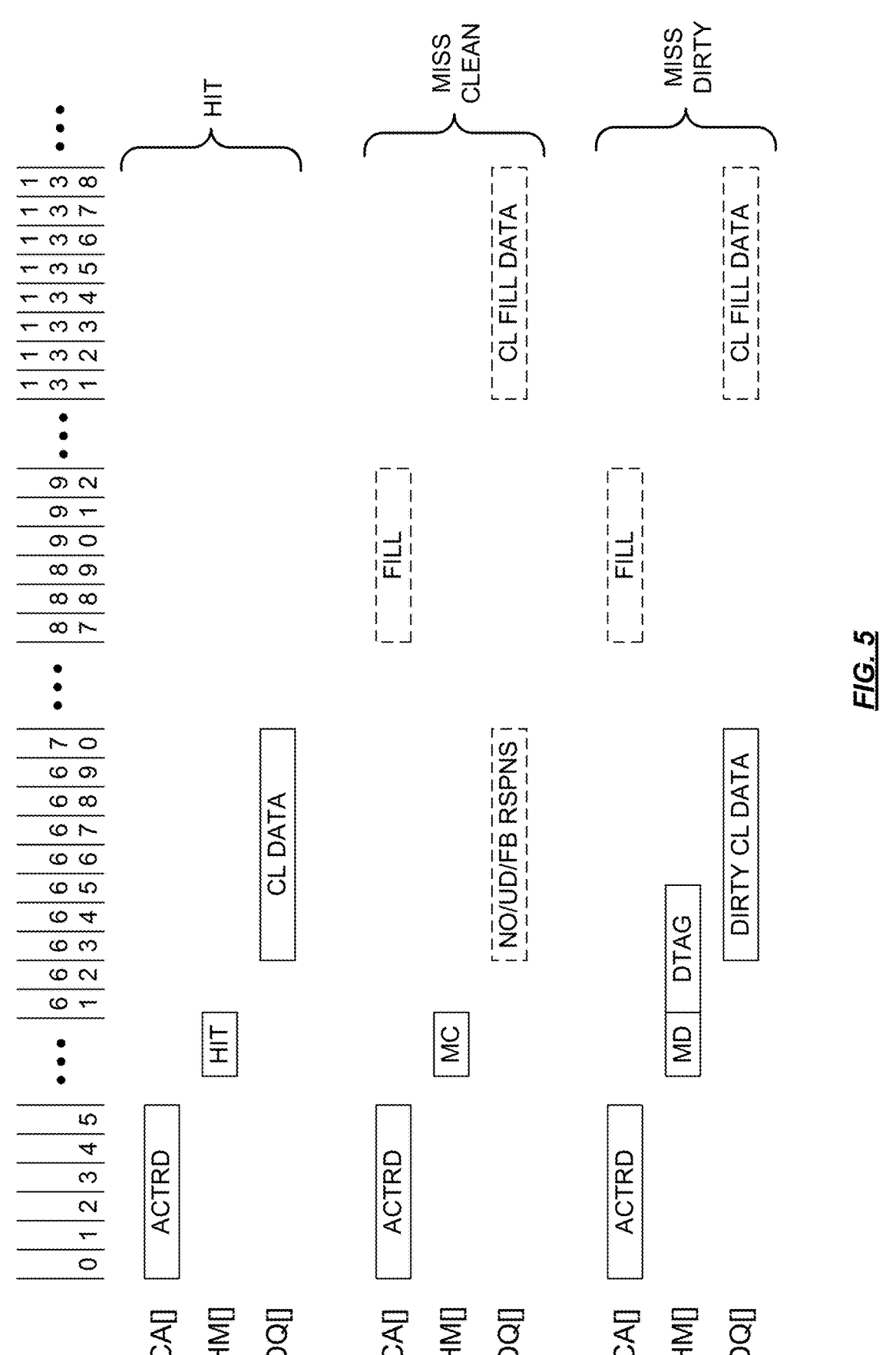
FIG. 5 illustrates example bus communications for cache data access commands.

Note that the hit, and miss dirty cache status's result in cache line data being communicated with controller 120 via DQ interface 112 and DQ interface 122. The miss clean cache status may result in cache line data (e.g., from a flush buffer) being communicated with controller 120 via DQ interface 112 and DQ interface 122. These communications are illustrated in FIG. 5 where the cache status (and optionally other information—e.g., dirty tag value for a "dirty-miss") is communicated via HM interface 113 and cache line data is communicated (or may be communicated for a miss clean) via DQ interface 112.

Figure 6A:
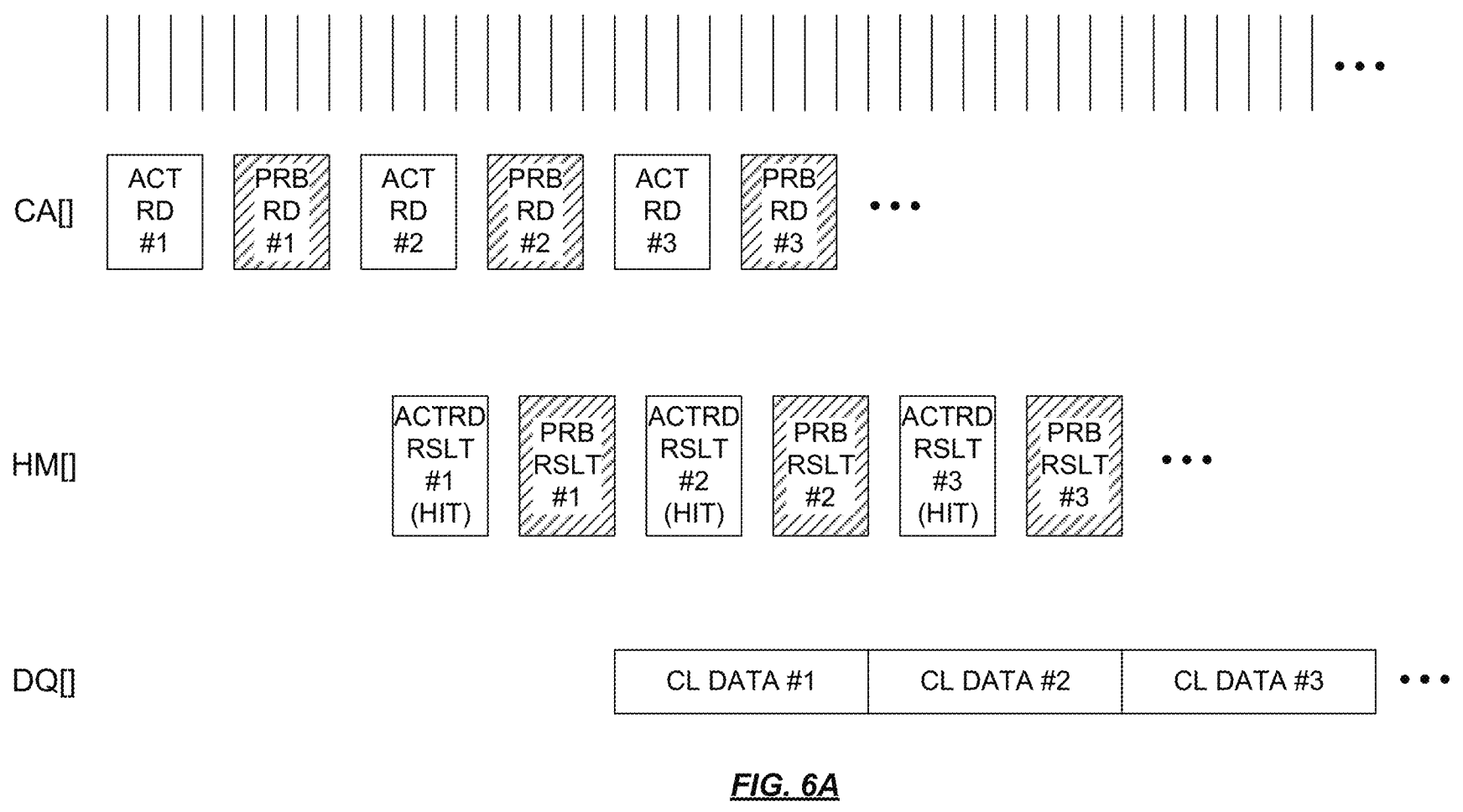
Figure 6B:
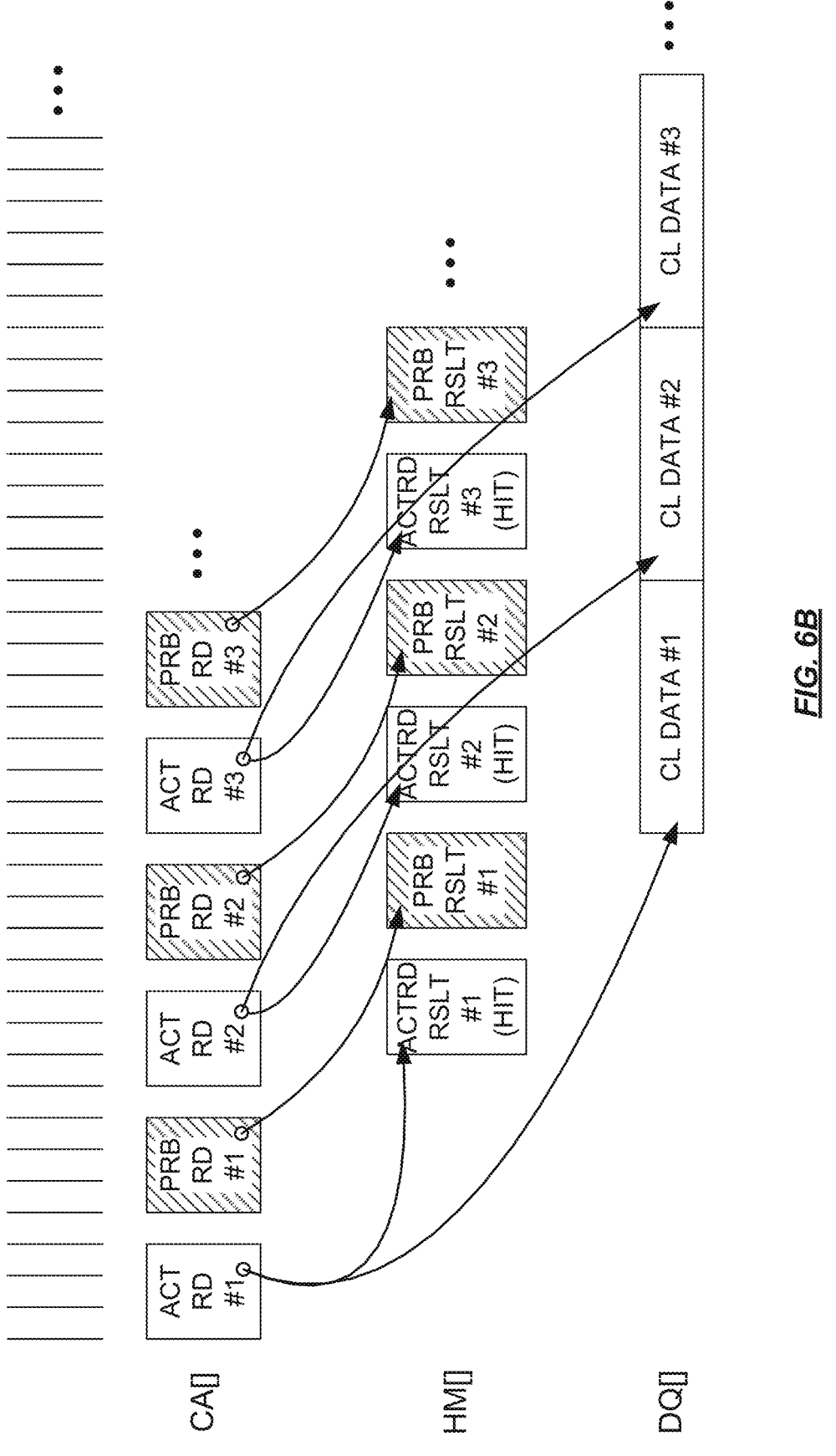

FIGS. 6A-6B illustrate bus communications for an example sequence of probe access and cache data access commands. The example sequence illustrated in FIGS. 6A-6B may be exchanged between, for example, controller 120 and memory device 110. In FIGS. 6A-6B, a first cache data access command (ACTRD #1) is issued via the command/address (CA[ ]) bus. The ACTRD #1 command results in a hit which is communicated via the hit/miss (HM[ ]) bus. This is illustrated in FIG. 6B by the arrow running from ACTRD #1 on the CA[ ] bus to ACTRD #1 result (ACTRD RSLT #1) on the HM[ ] bus. Based on ACTRD #1 resulting in a hit, the cache line data (CL DATA #1) associated with ACTRD #1 is returned via the data bus (DQ[ ]). This is illustrated in FIG. 6B by the arrow running from ACTRD #1 on the CA[ ] bus to CL DATA #1 on the DQ[ ] bus. Note that CL DATA #1 is illustrated occupying a greater number (e.g., double or approximately double) of time slots (i.e., unit intervals) on the DQ[ ] bus than are occupied on the CA[ ] bus to issue each commands (e.g., ACTRD #1, PRBRD #1, etc.) on the CA[ ] bus.

After ACTRD #1 is finished being communicated, a first probe access command (PRBRD #1) is issued via the command/address (CA[ ]) bus. The PRBRD #1 command results in a result (e.g., hit, miss, clean, dirty, invalid, etc.) that is communicated via the hit/miss (HM[ ]) bus. This is illustrated in FIG. 6B by the arrow running from PRBRD #1 on the CA[ ] bus to PRBRD #1 result (PRB RSLT #1) on the HM[ ] bus. Because probe access commands do not return results via the DQ[ ] bus, no arrow is illustrated in FIG. 6B running from PRBRD #1 to data on the DQ[ ] bus.

After PRBRD #1 is finished being communicated, a second cache data access command (ACTRD #2) is issued via the command/address (CA[ ]) bus. The ACTRD #2 command results in a hit which is communicated via the hit/miss (HM[ ]) bus. This is illustrated in FIG. 6B by the arrow running from ACTRD #2 on the CA[ ] bus to ACTRD #2 result (ACTRD RSLT #2) on the HM[ ] bus. Based on ACTRD #2 resulting in a hit, the cache line data (CL DATA #2) associated with ACTRD #2 is returned via the data bus (DQ[ ]). This is illustrated in FIG. 6B by the arrow running from ACTRD #2 on the CA[ ] bus to CL DATA #2 on the DQ[ ] bus. Note that because of the timings used to issue and separate PRBRD #1 and ACTRD #2, CL DATA #2 immediately follows CL DATA #1 without any intervening communication resulting from PRBRD #1. Thus, it should be understood that in this example, cache data access commands and probe access commands may be issued consecutively, and/or alternately without having to delay the issuance of one type of access command or the other in order to ensure the availability of the DQ[ ] bus to communicate cache line data. Accordingly, in an embodiment, every other available (at least during certain command sequences and/or time periods) command issuance time slot on CA[ ] may be designated (or reserved) for cache data access commands and the remaining intervening (i.e., between cache data access commands) command issuance time slots on CA[ ] may be designated (or reserved) for cache probe access commands. In other words, for example, each cache data access command may be followed by a consecutive, without any intervening commands, cache probe access command, which may then be followed by another, consecutive and without any intervening commands, cache data access command, which may be followed by another, consecutive and without any intervening commands, cache probe access command, and so on. This is illustrated in FIGS. 6A-6B by interleaved ACTRD commands (ACTRD #1-ACTRD #3) and PRBRD commands (PRBRD #1-PRBRD #3). In an embodiment, the fact that a cache data access command immediately follows another cache data access command, may indicate that the second cache data access command is to be interpreted by memory device 110 as a cache probe access command. For example, two consecutive ACTRD commands may result in the second ACTRD command being interpreted, by both memory device 110 and controller 120, as a PRBRD command.

In an embodiment, cache probe access commands may be used for "snoop filtering" or "snooping." Snoop filtering is when there are two or more processors that can share memory. In other words, two or more processors have access to the same memory locations. As part of allowing two or more processors to have access to the same memory locations, the system makes sure that when one processor caches and/or updates the data associated with an address, the other processors don't have an older (i.e., invalid or incorrect) copy that is then used. This is solved with "snoop filtering" in which a message is sent to other processors asking the other processors to check if another processor has a copy of the cache line/data. In snoop filtering, the cache (e.g., memory device 110) may be asked to invalidate and write back any dirty data in the cache to the backing store.

Thus, in an embodiment, when memory device 110 and/or controller 120 are configured and/or operated to perform one or more snoop-filtering functions, then an operation sequences may be, for example: (1) memory device 110 receives command to "snoop" address A; (2) tag compare 152 compares "address-A" and metadata in memory banks 135; and (3) memory device 110 returns the snooping result (e.g., whether another cache/processor already fetched data or not, and if yes, which cache/processor fetched the corresponding data, and the status of the corresponding cache line—e.g., shared/modified/exclusive/etc.) to controller 120.

FIG. 7 is a flowchart illustrating a method of performing a cache data access command. One or more steps illustrated in FIG. 7 may be performed by, for example, memory system 100, and/or its components. From a controller, a cache data access command and associated tag query value are received (702). For example, memory device 110 may receive, from controller 120 and via command/address interface 111, a cache data access command (e.g., ACTRD) that is associated with a tag query value (e.g., encoded within, or provided alongside the ACTRD command).

The cache status of a cache line associated with the tag query value is determined (704). For example, memory device 110 may access, based on an address associated with the ACTRD command, a row in memory banks 130 to receive a tag information entry that includes a stored cache tag value. The stored cache tag value received from memory banks 130 value may be compared (e.g., by tag compare circuitry 152) with the tag query value received via CA interface 111. Based at least on the comparison of the stored cache tag value and the tag query value, memory device 110 may determine a cache status (e.g., hit/miss, clean/dirty, valid/invalid, etc.) of the cache line data stored in memory banks 140 that is associated with the tag information entry received from memory banks 130.

A cache status indicator for the cache line associated with the tag query value is transmitted via a hit/miss bus (706). For example, memory device 110 may transmit, via HM interface 113 and HM interface 123, an indicator of the cache status that memory device 110 determined using the tag information entry from memory banks 130 and the tag query value received in association with the ACTRD command. Whether the cache status of the cache line associated with the tag query value is a miss dirty or a hit is determined (708). For example, memory device 110 may determine whether the cache status determined for the cache line data stored in memory banks 140 that is associated with the tag information entry received from memory banks 130 is either a miss dirty or a hit.

If the cache status determined for the cache line data stored in memory banks 140 that is associated with the tag information entry received from memory banks 130 is not a miss dirty nor a hit, flow proceeds to block 710. If the cache status determined for the cache line data stored in memory banks 140 that is associated with the tag information entry received from memory banks 130 is a hit or a miss-dirty, flow proceeds to block 712. In block 710, no data associated with the cache data access command needs to be transmitted via a data bus (710). For example, based on memory device 110 determining that the cache status determined for the cache line data stored in memory banks 140 that is associated with the tag information entry received from memory banks 130 is not either a miss dirty or a hit, memory device 110 may transmit no data via DQ[ ] bus, or transmit other data in the DQ[ ] time slots that would otherwise have been used to transmit cache line data associated with the ACTRD command.

In block 712, data associated with the cache data access command is transmitted via a data bus (712). For example, based on memory device 110 determining that the cache status determined for the cache line data stored in memory banks 140 that is associated with the tag information entry received from memory banks 130 is either a miss dirty or a hit, memory device 110 may transmit, data via DQ[ ] bus, the cache line data associated with the ACTRD command received from memory banks 140. In another example, controller 120 may always (or at least sometimes) transmit write data associated with a ACTWR command via the DQ[ ] bus. In this case, for a miss dirty, the dirty cache line data may be transmitted at a later time (e.g., in response to a later command) by storing the dirty cache line data (e.g., in a flush buffer) until it can be transmitted via the DQ[ ] bus (e.g., at an otherwise unused set of timeslots and/or in response to a command).

FIG. 8 is a flowchart illustrating a method of performing a cache probe access command. One or more steps illustrated in FIG. 8 may be performed by, for example, memory system 100, and/or its components. From a controller, a probe access command and associated tag query value are received (802). For example, memory device 110 may receive, from controller 120 and via command/address interface 111, a probe access command (e.g., PRBRD) that is associated with a tag query value (e.g., encoded within, or provided alongside the PRBRD command).

The cache status of a cache line associated with the tag query value is determined (804). For example, memory device 110 may access, based on an address associated with the PRBRD command, a row in memory banks 130 to receive a tag information entry that includes a stored cache tag value. The stored cache tag value received from memory banks 130 value may be compared (e.g., by tag compare circuitry 152) with the tag query value received via CA interface 111. Based at least on the comparison of the stored cache tag value and the tag query value, memory device 110 may determine a cache status (e.g., hit/miss, clean/dirty, valid/invalid, etc.) of the cache line data stored in memory banks 140 that is associated with the tag information entry received from memory banks 130.

A cache status indicator for the cache line associated with the tag query value is transmitted via a hit/miss bus (806). For example, memory device 110 may transmit, via HM interface 113 and HM interface 123, an indicator of the cache status that memory device 110 determined using the tag information entry from memory banks 130 and the tag query value received in association with the PRBRD command. The remaining blocks in the flow illustrated in FIG. 8 may optionally be performed (e.g., by being in a mode or by design).

Boxes 808, 810, and 812 may, in some embodiments, not be performed. Whether the cache status of the cache line associated with the tag query value is a miss dirty may be determined (808). For example, memory device 110 may be configured (e.g., by being in a mode or by design) to determine whether the cache status determined for the cache line data stored in memory banks 140 that is associated with the tag information entry received from memory banks 130 is a miss dirty. If the cache status determined for the cache line data stored in memory banks 140 that is associated with the tag information entry received from memory banks 130 is not a miss dirty, flow proceeds to block 810. If the cache status determined for the cache line data stored in memory banks 140 that is associated with the tag information entry received from memory banks 130 is a miss dirty, flow proceeds to block 812. In block 810, no tag value associated with the cache data access command needs to be transmitted via a hit/miss bus (810). For example, based on memory device 110 determining that the cache status determined for the cache line data stored in memory banks 140 that is associated with the tag information entry received from memory banks 130 is not a miss dirty, memory device 110 may transmit no additional tag data (e.g., dirty tag value) via the HM[ ] bus.

In block 812, a tag value associated with the cache data access command is transmitted via a hit/miss bus (812). For example, based on memory device 110 determining that the cache status determined for the cache line data stored in memory banks 140 that is associated with the tag information entry received from memory banks 130 is a miss dirty, memory device 110 may transmit, via the HM[ ] bus, the dirty tag value received from memory banks 130.

FIG. 9 is a flowchart illustrating a method of operating a memory controller. One or more steps illustrated in FIG. 9 may be performed by, for example, memory system 100, and/or its components. By a controller and to a memory device, a cache access command and a first tag query value are transmitted (902). For example, controller 120 may transmit to memory device 110 via CA interface 121 and CA interface 111, a cache data access command (e.g., ACTRD) that includes and/or is associated with a first tag query value.

A status indicator for the cache line associated with the first tag query value is received via a hit/miss bus (904). For example, memory device may determine, based on a tag information entry from memory banks 130 accessed in response to the cache data access command and the first tag query value, a cache line status that is transmitted to controller 120 via HM interface 113 and HM interface 123 and also indicates that the corresponding cache line data in memory banks should be transmitted to controller 120 via DQ interface 112 and DQ interface 122.

Based on the cache line status indicator, cache line data is received from the memory device via a data bus (906). For example, based on the cache line status determined by memory device 110 to indicate the corresponding cache line data should be transmitted controller, memory device 110 may transmit, and controller 120 receive, the corresponding cache line data via DQ interface 112 and DQ interface 122. By a controller and to a memory device, a probe access command and a second tag query value are transmitted (908). For example, controller 120 may transmit to memory device 110 via CA interface 121 and CA interface 111, a probe access command (e.g., PRBRD) that includes and/or is associated with a second tag query value.

A status indicator for the cache line associated with the second tag query value is received via a hit/miss bus (910). For example, memory device may determine, based on a tag information entry from memory banks 130 accessed in response to the probe access command and the second tag query value, a cache line status that is transmitted to controller 120 via HM interface 113 and HM interface 123. Optionally, and based on the status indicator, a cache tag value may be received from the memory device via the hit/miss bus (912). For example, a cache status determined by memory device 110 may indicate that memory device is also to, in response to the probe access command and the cache status, transmit a cache tag value received from memory banks 130 (e.g. a cache tag value associated with a "dirty" cache line).

FIG. 10 is a flowchart illustrating a method of accessing cache data and probing cache tag information. One or more steps illustrated in FIG. 10 may be performed by, for example, memory system 100, and/or its components. Via a command/address interface and to a memory component, a first access command is transmitted, where the first access command is associated with a first tag query value and a first address and also indicating a first access to a first cache line information entry and first access to a first cache line both associated with the first address (1002). For example, controller 120, may transmit to memory device 110 and via CA interface 211 and CA interface 111, a first cache data access command (e.g., ACTRD) that indicates memory banks 130 are to be accessed at a specified address for a first tag information entry that includes a first tag value and first tag metadata and also indicates that memory banks 140 are to be accessed at the specified address for a first cache line of data associated with the specified address.

Via a cache result interface and from the memory component, a first response to the first access command that includes a first status indicator, where the first status indicator indicates that the first tag query value matches a first tag value from the first cache information entry and also indicates that the memory component is to communicate the first cache line with the controller (1004). For example, based on the first tag value from memory banks 130 matching the first tag query value, and the associated first tag metadata indicating that the corresponding first cache line of data is valid (i.e., either a hit clean or hit dirty), memory device 110 may transmit, to controller 120 via HM interface 113 and HM interface 123, an indicator (e.g., an indicator or a hit clean or hit dirty) that indicates to controller 120 that memory device 110 will be transmitting the first cache line of data to controller 120 (e.g., at a later DQ[ ] bus timeslot). In another example, controller 120 may always (or at least sometimes) transmit write data associated with a ACTWR command via the DQ[ ] bus. In this case, for a miss dirty, the memory device 110 may transmit, to controller 120 via HM interface 113 and HM interface 123, an indicator that dirty cache line data may be transmitted at a later time (e.g., in response to a later command) by storing the dirty cache line data (e.g., in a flush buffer) until it can be transmitted via the DQ[ ] bus (e.g., at an otherwise unused set of timeslots and/or in response to a command).

Via a command/address interface and to a memory component, a second access command is transmitted, where the second access command is associated with a second tag query value and a second address and also indicating a second access to a second cache line information entry and also indicating a second cache line associated with the second address is not to be accessed (1006). For example, controller 120, may transmit to memory device 110 and via CA interface 211 and CA interface 111, a second cache data access command (e.g., PRBRD) that indicates memory banks 130 are to be accessed at a specified address for a second tag information entry that includes a second tag value and second tag metadata and also indicates that memory banks 140 are not to be accessed at the specified address for a second cache line of data associated with the specified address.

Via a cache result interface and from the memory component, a second response to the second access command that includes a second status indicator, where the second status indicator indicates that the second tag query value matches a second tag value from the second cache information entry (1008). For example, based on the second tag value from memory banks 130 matching the second tag query value, and the associated second tag metadata indicating that the corresponding second cache line of data is valid (i.e., either a hit clean or hit dirty), memory device 110 may transmit, to controller 120 via HM interface 113 and HM interface 123, an indicator (e.g., an indicator or a hit clean or hit dirty) that at least indicates to controller 120 that the cache line associated with the queried address is present in memory banks 140.

FIG. 11 is a flowchart illustrating a method of responding to host memory access requests. One or more steps illustrated in FIG. 11 may be performed by, for example, memory system 100, and/or its components. By a controller, a plurality of memory access requests are received (1102). For example, controller 120 may receive, from host 160, requests to access memory device 110 in order to read and/or write cache line data stored by memory device 110. Controller 120 may place the access requests (or indicators of the access request) in one or more queues for processing and/or execution when memory device 110 is available (e.g., when memory device 110 is not busy performing one or more previous access requests).

By the controller and from the plurality of memory access requests, a memory access request to be the subject of a probe access command is selected (1104). For example, controller 120 may select a pending access request to access memory device 110 to be the subject of a probe access command in order to determine whether the cache line that is the subject of the pending access request is present in memory banks 140. In an embodiment, controller 120 may select the pending access request based on the length of pendency of the access request. For example, controller 120 may select the pending access request based on the amount of time the access request has been waiting, or its position in an access request queue. In an embodiment, controller 120 selects a pending access request that was most recently received. In an embodiment, controller 120 selects a pending access request from a group (e.g., bin) of access requests that have been recently received. In an embodiment, controller 120 may select a pending access request based at least in part (e.g., in addition to length of pendency) on whether the memory bank the pending access request is available to perform the access request (i.e., there is not an access conflict that would slow or prevent the access request from being performed). For example, controller 120 may select a pending access request from the last N number of received access requests, where N=2, 4, 8, 10, 16, etc.

By the controller and to a memory device, a probe access request associated with the address of the selected memory access request is transmitted (1106). For example, controller 120 may transmit, to memory device 110, a probe access request to determine whether the cache line associated with the selected access request from host 160 is present (and/or other cache state) in memory device 110.

A cache line status indicator for the cache line associated with the memory access request is received via a hit/miss bus (1108). For example, in response to the probe access command associated with the selected access, memory device 110 may transmit, and controller 120 receive, via HM interface 113 and HM interface 123, an indicator of whether the cache line associated with the selected memory access request is present in memory banks 140. Based on the status indicator, cache tag value data from the memory device is received via the hit/miss bus (1110). For example, memory device 110 may be configured to, in response to a miss dirty condition, transmit the cache tag value associated with the dirty cache line stored in memory banks 140.

FIG. 12 is a flowchart illustrating a method of accessing cache line data. One or more steps illustrated in FIG. 12 may be performed by, for example, memory system 100, and/or its components. By a controller and to a memory device, a probe access command is transmitted (1202). For example, controller 120 may transmit, to memory device 110, a probe access command and associated tag query value.

Via a hit/miss bus and by the controller, a cache status indicator associated with the cache line associated with the tag query value is received (1204). For example, memory device 110 may transmit, to controller 120 and via HM interface 113 and HM interface 123, a cache status indicator (e.g., hit clean) detailing the status of the cache line that was the subject of the probe access command. Based on the cache status indicator and by the controller, a data access command is transmitted (1206). For example, based on an indication that the cache line that was the subject of the probe access command is present in memory banks 140, controller 120 may transmit a read access command to memory device 110 to access the subject cache line from memory banks 140. This read access command may, in some embodiments, not result in memory banks 130 being accessed. This read access command may, in some embodiments, result in memory banks 130 being accessed (e.g., ACTRD).

In response to the data access command, by the controller and via a data bus, the cache line associated with the tag query value is received (1208). For example, in response to the read access command directed to the subject cache line in memory banks 140, memory device 110 may transmit, and controller 120 receive, via DQ interface 112 and DQ interface 122, the subject cache line.

FIG. 13 is a flowchart illustrating a method of receiving cache line data. One or more steps illustrated in FIG. 13 may be performed by, for example, memory system 100, and/or its components. By a controller and to a memory device, a probe access command is transmitted (1302). For example, controller 120 may transmit, to memory device 110, a probe access command and associated tag query value.

Via a hit/miss bus and by the controller, a cache status indicator associated with the cache line associated with the tag query value is received (1304). For example, memory device 110 may transmit, to controller 120 and via HM interface 113 and HM interface 123, a cache status indicator (e.g., hit clean) detailing the status of the cache line that was the subject of the probe access command. Based on the cache status indicator, a timing for the cache line associated with the tag query value is determined (1306). For example, based on an indication that the cache line that was the subject of the probe access command is present in memory banks 140, controller 120 may be configured to receive, and memory device 110 configured to transmit, the subject cache line a predetermined (or configured) number of clock cycles after the probe access command was transmitted. In another example, based on an indication that the cache line that was the subject of the probe access command is present in memory banks 140, controller 120 may be configured to receive, and memory device 110 configured to transmit, the subject cache line at a time the DQ bus is otherwise idle (e.g., during a DQ bus slot for an ACTRD command that was a miss clean). Memory device 110 may store the subject cache line, or the dirty cache line, in a buffer (e.g., flush buffer) to await the time for the subject cache line to be transmitted to controller 120.

In response to the probe access command, by the controller and via a data bus, the cache line associated with the tag query value is received (1308). For example, in response to the probe access command directed to the subject cache line in memory banks 140, memory device 110 may transmit, and controller 120 receive, via DQ interface 112 and DQ interface 122, the subject cache line at the predetermined time. In another example, in response to the probe access command directed to the subject cache line in memory banks 140, memory device 110 may transmit, and controller 120 receive, via DQ interface 112 and DQ interface 122, the subject cache line when the DQ bus would have otherwise been idle.

FIG. 14 is a flowchart illustrating a method of performing a cache probe access command. One or more steps illustrated in FIG. 14 may be performed by, for example, memory system 100, and/or its components. From a controller, a snoop-filter access command and associated tag query value are received (1402). For example, memory device 110 may receive, from controller 120 and via command/address interface 111, a snoop-filter access command that is associated with a tag query value (e.g., encoded within, or provided alongside the snoop-filter access command).

The cache status of a cache line associated with the tag query value is determined (1404). For example, memory device 110 may access, based on an address associated with the snoop-filter command, a row in memory banks 130 to receive a tag information entry that includes a stored cache tag value. The stored cache tag value received from memory banks 130 value may be compared (e.g., by tag compare circuitry 152) with the tag query value received via CA interface 111. Based at least on the comparison of the stored cache tag value and the tag query value, memory device 110 may determine a cache status (e.g., modified/unmodified, exclusive/non-exclusive, shared/unshared, valid/invalid, etc.) of the cache line data associated with the tag information entry received from memory banks 130.

A cache status indicator for the cache line associated with the tag query value is transmitted via a hit/miss bus (1406). For example, memory device 110 may transmit, via HM interface 113 and HM interface 123, an indicator of the cache status that memory device 110 determined using the tag information entry from memory banks 130 and the tag query value received in association with the snoop-filter access command. The cache line status indicator is transmitted to another cache controller (1408). For example, controller 120 may transmit, to another controller not coupled to memory device 110, an indicator of the snoop-filter status of the tag query value received in association with the snoop-filter access command.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of memory system 100, and/or its components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 15:
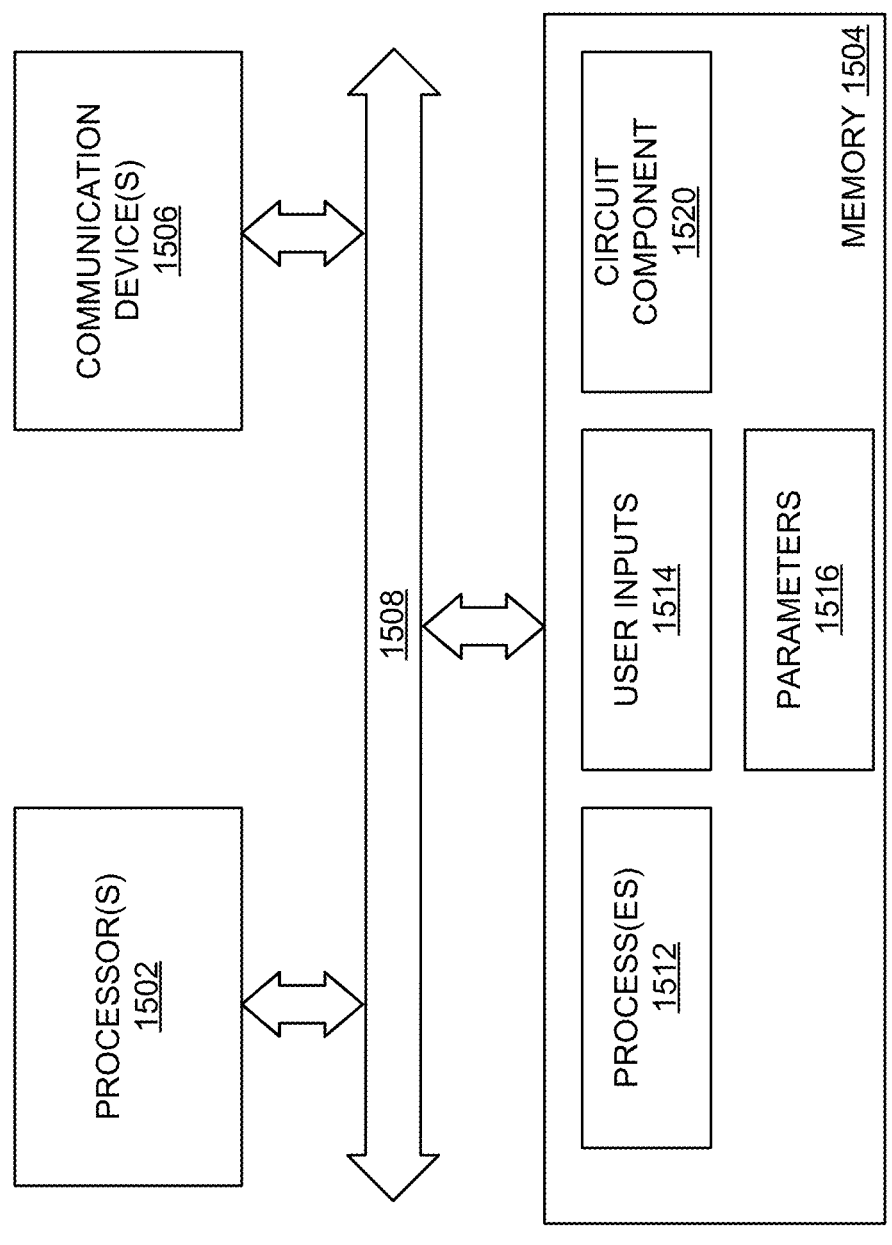
FIG. 15 is a block diagram of a processing system.

FIG. 15 is a block diagram illustrating one embodiment of a processing system 1500 for including, processing, or generating, a representation of a circuit component 1520. Processing system 1500 includes one or more processors 1502, a memory 1504, and one or more communications devices 1506. Processors 1502, memory 1504, and communications devices 1506 communicate using any suitable type, number, and/or configuration of wired and/or wireless connections 1508.

Processors 1502 execute instructions of one or more processes 1512 stored in a memory 1504 to process and/or generate circuit component 1520 responsive to user inputs 1514 and parameters 1516. Processes 1512 may be any suitable electronic design automation (EDA) tool or portion thereof used to design, simulate, analyze, and/or verify electronic circuitry and/or generate photomasks for electronic circuitry. Representation 1520 includes data that describes all or portions of memory system 100, and/or its components, as shown in the Figures.

Representation 1520 may include one or more of behavioral, register transfer, logic component, transistor, and layout geometry-level descriptions. Moreover, representation 1520 may be stored on storage media or communicated by carrier waves.

Data formats in which representation 1520 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 1514 may comprise input parameters from a keyboard, mouse, voice recognition interface, microphone and speakers, graphical display, touch screen, or other type of user interface device. This user interface may be distributed among multiple interface devices. Parameters 1516 may include specifications and/or characteristics that are input to help define representation 1520. For example, parameters 1516 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1504 includes any suitable type, number, and/or configuration of non-transitory computer-readable storage media that stores processes 1512, user inputs 1514, parameters 1516, and circuit component 1520.

Communications devices 1506 include any suitable type, number, and/or configuration of wired and/or wireless devices that transmit information from processing system 1500 to another processing or storage system (not shown) and/or receive information from another processing or storage system (not shown). For example, communications devices 1506 may transmit circuit component 1520 to another system. Communications devices 1506 may receive processes 1512, user inputs 1514, parameters 1516, and/or circuit component 1520 and cause processes 1512, user inputs 1514, parameters 1516, and/or circuit component 1520 to be stored in memory 1504.

Implementations discussed herein include, but are not limited to, the following examples:

Example 1: A memory component, comprising: a first dynamic random access memory (DRAM) array to store a plurality of cache information entries, each cache information entry comprising a tag field and at least one flag; a second DRAM array to store a plurality of cache lines; a command/address interface to receive a first access command, in association with a first tag query value, indicating a first access to the first DRAM array and a first access to the second DRAM array, the first access to the first DRAM array to access a first cache information entry addressed by a first address, the first cache information entry comprising a first tag value and a first flag value, the first access to the second DRAM array to access a first cache line associated with the first address; the command/address interface to receive a second access command, in association with a second tag query value, indicating a second access the first DRAM array and indicating the second DRAM array is not to be accessed in response to the second access command, the second access to the first DRAM array to access a second cache information entry addressed by a second address, the second cache information entry comprising a second tag value and a second flag value; a cache result interface to transmit a first status indicator and a second status indicator, the first status indicator including a first hit/miss indication indicating whether the first tag query value matches the first tag value, the second status indicator including a second hit/miss indication indicating whether the second tag query value matches the second tag value; and a data interface to communicate cache lines with the controller, the first status indicator also indicating to the controller a content of a response to the first access command to be communicated via the data interface.

Example 2: The memory component of example 1, wherein the first DRAM array includes a first bank and a second bank, the first address to be directed to the first bank and the second address to be directed to the second bank.

Example 3: The memory component of example 2, wherein the first access command and the second access command are received consecutively by the command/address interface.

Example 4: The memory component of example 3, wherein the second access command being received consecutively after the first access command indicates the second DRAM array is not to be accessed in response to the second access command.

Example 5: The memory component of example 1, wherein, based on the second status indicator, the command/address interface is to receive, from the controller, a third access command indicating a second access to the second DRAM array to access a second cache line associated with the second address.

Example 6: The memory component of example 5, wherein the third access command indicates the first DRAM array is not to be accessed in response to the third access command.

Example 7: The memory component of example 1, wherein the second status indicator at least indicates whether the second cache information entry corresponds to a valid cache information entry, whether the second tag query value matches the second tag value, whether the second tag query value does not match the second tag value where a second cache line associated with the second address has been modified.

Example 8: A memory component, comprising: a command/address interface to receive a first access command and a second access command, the first access command being associated with a first tag query value and a first address and indicating a first access to a first cache information entry and first access to a first cache line both associated with the first address, the second access command being associated with a second tag query value and a second address and indicating a second access to a second cache information entry associated with the second address and also indicating a second cache line associated with the second address is not to be accessed; a cache information dynamic random access memory (DRAM) array to store the first cache information entry and the second cache information entry, the first cache information entry including a first tag value and a first at least one flag, the second cache information entry including a second tag value and a second at least one flag; a cache line DRAM array to store the first cache line and the second cache line; a data interface to communicate the first cache line with a controller; and a cache result interface to transmit, in response to the first access command, a first status indicator to a controller, the first status indicator to indicate that the first tag query value matches the first tag value and that the data interface is to communicate the first cache line with the controller, the second status indicator to indicate whether the second cache tag query value matches the second tag value.

Example 9: The memory component of example 8, wherein the cache information DRAM array includes a first bank and a second bank, the first address to be directed to the first bank and the second address to be directed to the second bank.

Example 10: The memory component of example 9, wherein the first access command and the second access command are received consecutively and without an intervening access command, by the command/address interface.

Example 11: The memory component of example 10, wherein the second access command being received consecutively after the first access command indicates the cache information DRAM array is not to be accessed in response to the second access command.

Example 12: The memory component of example 8, wherein the command/address interface is to receive a third access command associated with the second address indicating the second cache line is to be accessed, the third access command being transmitted, by the controller, based on the second status indicator.

Example 13: The memory component of example 12, wherein the third access command indicates the cache information DRAM array is not to be accessed in response to the third access command.

Example 14: The memory component of example 8, wherein the second status indicator is to indicate the cache result interface is to communicate the second tag value.

Example 15: A method of operating a memory controller, comprising: transmitting, via a command/address interface and to a memory component, a first access command, the first access command associated with a first tag query value and a first address and also indicating a first access to a first cache information entry and first access to a first cache line both associated with the first address; receiving, via a cache result interface and from the memory component, a first response to the first access command that includes a first status indicator, the first status indicator indicating that the first tag query value matches a first tag value from the first cache information entry and also indicating that the memory component is to communicate the first cache line with the controller; transmitting, via the command/address interface and to the memory component, a second access command associated with a second tag query value and a second address and indicating a second access to a second cache information entry associated with the second address and also indicating a second cache line associated with the second address is not to be accessed; and receiving, via the cache result interface and from the memory component, a second response to the second access command that includes a second status indicator, the second status indicator indicating whether the second tag query value matches a second tag value from the second cache information entry.

Example 16: The method of example 15, wherein the first address is directed to a first bank of the memory component and the second address is directed to a second bank of the memory component.

Example 17: The method of example 16, wherein the first access command and the second access command are transmitted consecutively and without transmitting an intervening access command.

Example 18: The method of example 17, wherein the second access command being transmitted consecutively after the first access command indicates the second cache line associated with the second address is not to be accessed.

Example 19: The method of example 15, further comprising: based on the second status indicator, transmitting, via the command/address interface and to the memory component, a third access command associated with the second address indicating the second cache line is to be accessed.

Example 20: The method of example 19, wherein the third access command indicates the second cache information entry is not to be accessed in response to the third access command.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A memory component, comprising:
a first dynamic random access memory (DRAM) array to store a plurality of cache information entries, each cache information entry comprising a tag field and at least one flag;
a second DRAM array to store a plurality of cache lines;
a command/address interface to receive a first access command from a controller, in association with a first tag query value, indicating a first access to the first DRAM array and a first access to the second DRAM array, the first access to the first DRAM array to access a first cache information entry addressed by a first address, the first cache information entry comprising a first tag value and a first flag value, the first access to the second DRAM array to access a first cache line associated with the first address;
the command/address interface to receive a second access command from the controller, in association with a second tag query value, indicating a second access the first DRAM array and indicating the second DRAM array is not to be accessed in response to the second access command, the second access to the first DRAM array to access a second cache information entry addressed by a second address, the second cache information entry comprising a second tag value and a second flag value;
a cache result interface, distinct from the command/address interface, to transmit a first status indicator and a second status indicator to the controller, the first status indicator including a first hit/miss indication indicating whether the first tag query value matches the first tag value, the second status indicator including a second hit/miss indication indicating whether the second tag query value matches the second tag value; and
a data interface, distinct from the command/address interface and distinct from the cache result interface, to communicate cache lines with the controller, the first status indicator also indicating to the controller a content of a response to the first access command to be communicated via the data interface.

2. The memory component of claim 1, wherein the first DRAM array includes a first bank and a second bank, the first address to be directed to the first bank and the second address to be directed to the second bank.

3. The memory component of claim 2, wherein the first access command and the second access command are received consecutively by the command/address interface.

4. The memory component of claim 3, wherein the second access command being received consecutively after the first access command indicates the second DRAM array is not to be accessed in response to the second access command.

5. The memory component of claim 1, wherein, based on the second status indicator, the command/address interface is to receive, from the controller, a third access command indicating a second access to the second DRAM array to access a second cache line associated with the second address.

6. The memory component of claim 5, wherein the third access command indicates the first DRAM array is not to be accessed in response to the third access command.

7. The memory component of claim 1, wherein the second status indicator at least indicates whether the second cache information entry corresponds to a valid cache information entry, whether the second tag query value matches the second tag value, and whether the second tag query value does not match the second tag value where a second cache line associated with the second address has been modified.

8. A memory component, comprising:
a command/address interface to receive a first access command and a second access command, the first access command being associated with a first tag query value and a first address and indicating a first access to a first cache information entry and first access to a first cache line both associated with the first address, the second access command being associated with a second tag query value and a second address and indicating a second access to a second cache information entry associated with the second address and also indicating a second cache line associated with the second address is not to be accessed;
a cache information dynamic random access memory (DRAM) array to store the first cache information entry and the second cache information entry, the first cache information entry including a first tag value and a first at least one flag, the second cache information entry including a second tag value and a second at least one flag;
a cache line DRAM array to store the first cache line and the second cache line;
a data interface, distinct from the command/address interface, to communicate the first cache line with a controller; and
a cache result interface, distinct from the command/address interface and distinct from the data interface, to transmit, in response to the first access command, a first status indicator to the controller, the first status indicator to indicate that the first tag query value matches the first tag value and that the data interface is to communicate the first cache line with the controller, the second status indicator to indicate whether the second cache tag query value matches the second tag value.

9. The memory component of claim 8, wherein the cache information DRAM array includes a first bank and a second bank, the first address to be directed to the first bank and the second address to be directed to the second bank.

10. The memory component of claim 9, wherein the first access command and the second access command are received consecutively and without an intervening access command, by the command/address interface.

11. The memory component of claim 10, wherein the second access command being received consecutively after the first access command indicates the cache information DRAM array is not to be accessed in response to the second access command.

12. The memory component of claim 8, wherein the command/address interface is to receive a third access command associated with the second address indicating the second cache line is to be accessed, the third access command being transmitted, by the controller, based on the second status indicator.

13. The memory component of claim 12, wherein the third access command indicates the cache information DRAM array is not to be accessed in response to the third access command.

14. The memory component of claim 8, wherein the second status indicator is to indicate the cache result interface is to communicate the second tag value.

15. A method of operating a memory controller, comprising:

transmitting, via a command/address interface and to a memory component, a first access command, the first access command associated with a first tag query value and a first address and also indicating a first access to a first cache information entry and first access to a first cache line both associated with the first address;

receiving, via a cache result interface that is distinct from the command/address interface and from the memory component, a first response to the first access command that includes a first status indicator, the first status indicator indicating that the first tag query value matches a first tag value from the first cache information entry and also indicating that the memory component is to communicate the first cache line with the controller via a data interface that is distinct from the command/address interface and is distinct from the cache result interface;

transmitting, via the command/address interface and to the memory component, a second access command associated with a second tag query value and a second address and indicating a second access to a second cache information entry associated with the second address and also indicating a second cache line associated with the second address is not to be accessed and is not, based on the second access command, to be communicated with controller via the data interface; and receiving, via the cache result interface and from the memory component, a second response to the second access command that includes a second status indicator, the second status indicator indicating whether the second tag query value matches a second tag value from the second cache information entry.

16. The method of claim 15, wherein the first address is directed to a first bank of the memory component and the second address is directed to a second bank of the memory component.

17. The method of claim 16, wherein the first access command and the second access command are transmitted consecutively and without transmitting an intervening access command.

18. The method of claim 17, wherein the second access command being transmitted consecutively after the first access command indicates the second cache line associated with the second address is not to be accessed.

19. The method of claim 18, wherein the third access command indicates the second cache information entry is not to be accessed in response to the third access command.

20. The method of claim 15, further comprising:

based on the second status indicator, transmitting, via the command/address interface and to the memory component, a third access command associated with the second address indicating the second cache line is to be accessed.

* * * * *